(12) United States Patent
Sevin et al.

(10) Patent No.: US 11,533,152 B2
(45) Date of Patent: Dec. 20, 2022

(54) METHOD AND APPARATUS FOR COORDINATING MULTI-USER MULTI-ACCESS POINT TRANSMISSIONS

(71) Applicant: CANON KABUSHIKI KAISHA, Tokyo (JP)

(72) Inventors: Julien Sevin, Saint Aubin du Cormier (FR); Patrice Nezou, Liffre (FR); Pascal Viger, Janze (FR); Stéphane Baron, Le Rheu (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/121,102

(22) Filed: Dec. 14, 2020

(65) Prior Publication Data
US 2021/0194659 A1   Jun. 24, 2021

(30) Foreign Application Priority Data

Dec. 20, 2019 (GB) .................................. 1919090
Jan. 9, 2020 (GB) .................................. 2000321

(51) Int. Cl.
*H04L 12/26* (2006.01)
*H04L 5/00* (2006.01)

(52) U.S. Cl.
CPC .......... *H04L 5/0064* (2013.01); *H04L 5/0032* (2013.01); *H04L 5/0046* (2013.01); *H04L 5/0053* (2013.01)

(58) Field of Classification Search
None
See application file for complete search history.

(56) References Cited

U.S. PATENT DOCUMENTS

| 2014/0328264 | A1  | 11/2014 | Merlin et al. |
| 2015/0063327 | A1  | 3/2015  | Barriac et al. |
| 2018/0242394 | A1  | 8/2018  | Wong et al. |
| 2019/0342891 | A1* | 11/2019 | Asterjadhi ............ H04W 84/12 |
| 2020/0076552 | A1* | 3/2020  | Cherian ............ H04W 72/044 |
| 2020/0260488 | A1* | 8/2020  | Cherian ............ H04W 56/001 |

FOREIGN PATENT DOCUMENTS

| EP | 3691384 A1 | 8/2020 |
| WO | 2020/068385 A1 | 4/2020 |
| WO | 2020/072461 A1 | 4/2020 |

* cited by examiner

*Primary Examiner* — Zewdu A Beyen
(74) *Attorney, Agent, or Firm* — Canon U.S.A., Inc. IP Division

(57) ABSTRACT

Aspects of the present disclosure generally relate to a wireless communication method in a wireless network comprising a plurality of access points (APs) sharing a communication channel, each AP is configured to manage stations of a basic service set (BSS), the method comprising at a coordinator AP: signaling to another AP, referred to as coordinated AP, that the coordinator AP has gained access to the communication channel; and sending to the coordinated AP a resource allocation allocating a chunk of the communication channel for stations managed by the coordinated AP.

19 Claims, 17 Drawing Sheets

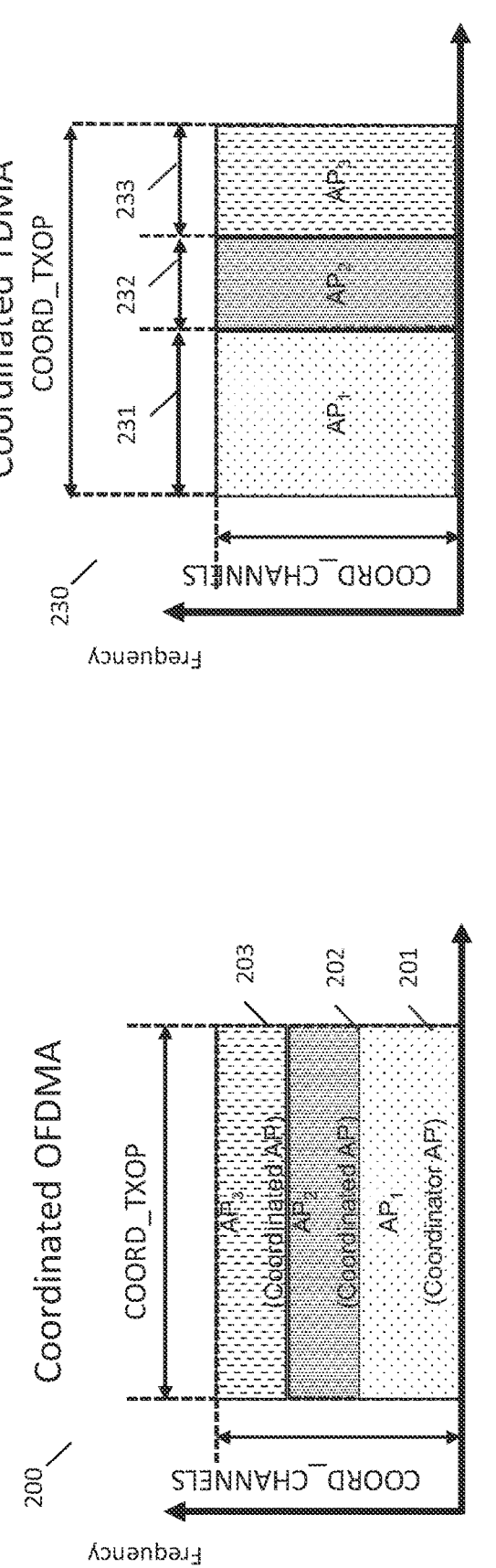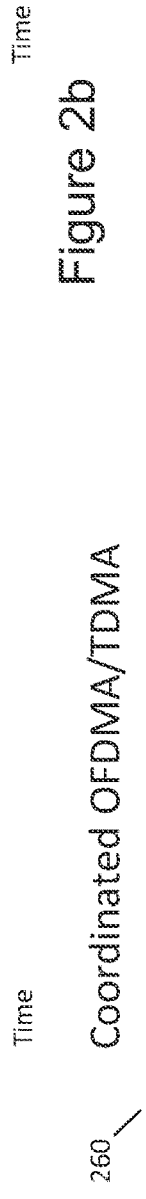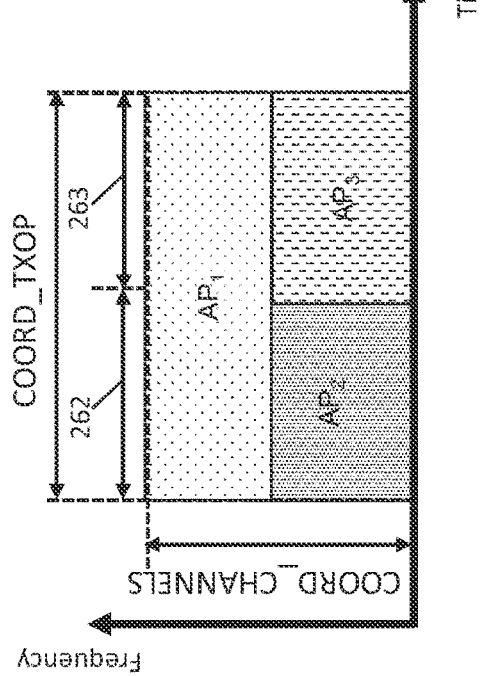
Figure 2b
Figure 2c
Figure 2a

METHOD AND APPARATUS FOR COORDINATING MULTI-USER MULTI-ACCESS POINT TRANSMISSIONS

CROSS REFERENCE TO RELATED APPLICATION

This application claims the benefit under 35 U.S.C. § 119(a)-(d) of United Kingdom Patent Application No. 1919090.9, filed on Dec. 20, 2019 and entitled "METHOD AND APPARATUS FOR COORDINATING MULTI-USER MULTI-ACCESS POINT TRANSMISSIONS" and Patent Application No. 2000321.6, filed on Jan. 9, 2020 and entitled "METHOD AND APPARATUS FOR COORDINATING MULTI-USER MULTI-ACCESS POINT TRANSMISSIONS". The above cited patent application is incorporated herein by reference in its entirety.

FIELD OF THE INVENTION

The invention relates to the technical field of wireless communication networks, and more particularly methods and devices for coordinating multiple Access Points in Extremely High Throughput (EHT) systems.

BACKGROUND OF THE INVENTION

With the emergence of real-time applications such as online gaming, real-time video streaming, virtual reality, and remote-control drone and robots, new requirements and issues need to be taken into consideration, in particular in terms of latency and robustness. In this context, the IEEE 802.11 working group considered this problematic as a goal for the next major 802.11 release (802.11be) and one of selected technologies is the Multi-AP coordination strategy.

Multi-AP technology consists in enabling some degree of collaboration among neighbouring EHT APs in order to have a more efficient utilization of the limited time, frequency and spatial resources available. This is particularly important when the neighbouring EHT APs operate over a same selected channel. With such a technology, two neighbouring EHT APs may share resources in terms of frequency or time and, in this way, prevents interferences. EHT APs that collaborate together to share resources are referred to as coordinated APs. Moreover, the data transmission established by coordinated APs is referred as Multi-AP transmission.

Typically, a Multi-AP coordination scheme is based on a coordinated OFDMA scheme/sharing wherein coordinated EHT APs synchronise their data transmissions, and use orthogonal time/frequency resources. The set of the collaborating EHT APs is referred to as Multi-AP group and a notion of coordinator/coordinated AP is introduced in order to operate a Multi-AP transmission. Basically, the coordinator AP is the EHT AP of the Multi-AP group that gains the medium access right for a given time (TXOP) on a given channel. The coordinator AP may then share time/frequency resources within the given time period between coordinated APs of the Multi-AP group. A coordinated AP schedules then downlink (DL) and/or uplink (UL) transmissions for its associated non-AP stations within the constraints of its allocated resources.

SUMMARY OF INVENTION

In such a context, the global objective of the invention is a communication method for coordinating multiple Access Points.

An objective of embodiments of the invention is to specify a communication method for initiating a multi-AP transmission by the coordinator AP by advertising the EHT APs of the multi-AP group.

Another objective of embodiments of the invention is to specify a method for identifying which coordinated APs have the intention of participating in the multi-AP transmission in order to compute an efficient coordinated APs resource allocation.

Yet another objective of embodiments of the invention is to specify a method for retrieving the traffic needs of the coordinated APs which have the intention of participating in the multi-AP transmission in order to compute a more efficient coordinated APs resource allocation.

The above objectives are addressed by one or more of the following aspects of the present disclosure.

An aspect of the present disclosure provides a wireless communication method in a wireless network comprising a plurality of access points (APs) sharing a communication channel, each AP is configured to manage stations of a basic service set (BSS), the method comprising at a coordinator AP:

signaling to another AP, referred to as coordinated AP, that the coordinator AP has gained access to the communication channel; and sending to the coordinated AP a resource allocation allocating a chunk of the communication channel for stations managed by the coordinated AP, wherein the resource allocation is determined based on resource needs provided by the coordinated AP.

Another aspect of the present disclosure provides wireless communication method in a wireless network comprising a plurality of access points (APs) sharing a communication channel, each AP is configured to manage stations of a basic service set (BSS), the method comprising at a coordinator AP:

signaling to another AP, referred to as coordinated AP, that the coordinator AP has gained access to the communication channel; and sending to the coordinated AP a resource allocation allocating a chunk of the communication channel for stations managed by the coordinated AP, wherein the resource allocation is determined by sharing the gained communication channel between the plurality of APs without the coordinated APs having provided their resource needs.

Yet a further aspect of the present disclosure provides a wireless communication method in a wireless network comprising a plurality of access points (APs) sharing a communication channel, each AP is configured to manage stations of a basic service set (BSS), the method comprising at a coordinator AP:

signaling to another AP, referred to as coordinated AP, that the coordinator AP has gained access to the communication channel; and sending to the coordinated AP a resource allocation allocating a chunk of the communication channel for stations managed by the coordinated AP, wherein the signaling comprises a response type indication for indicating a response type expected from the coordinated AP.

Yet a further aspect of the present disclosure provides a wireless communication method in a wireless network comprising a plurality of access points (APs) sharing a communication channel, each AP is configured to manage stations of a basic service set (BSS), the method comprising at a coordinator AP that has gained access to the communication channel:

performing an intra-AP resource allocation by allocating a chunk of the communication channel for stations managed by the coordinator AP; and sending to another AP, referred to as coordinated AP, a resource allocation allocating, for stations managed by the coordinated AP, a chunk from a remaining part of the communication channel not allocated to stations managed by the coordinator AP.

Yet a further aspect of the present disclosure provides a wireless communication method in a wireless network comprising a plurality of access points (APs) sharing a communication channel, each AP is configured to manage stations of a basic service set (BSS), the method comprising at a coordinated AP:

receiving signaling that another AP, referred to as coordinator AP, has gained access to the communication channel; and providing, to the coordinator AP, resource needs of stations managed by the coordinated AP.

Yet a further aspect of the invention relates to a non-transitory computer-readable medium storing a program which, when executed by a microprocessor or computer system in a device, causes the device to perform any method as defined above.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible carrier medium may comprise a storage medium such as a hard disk drive, a magnetic tape device or a solid-state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Further advantages of the present invention will become apparent to those skilled in the art upon examination of the drawings and detailed description. Embodiments of the invention will now be described, by way of example only, and with reference to the following drawings:

FIGS. 2a, 2b and 2c illustrate examples of Time/Frequency resources sharing schemes that can be envisaged in an enhanced multiple AP coordination system, in accordance with one or more example embodiments of the present disclosure;

DETAILED DESCRIPTION

Figure 1:
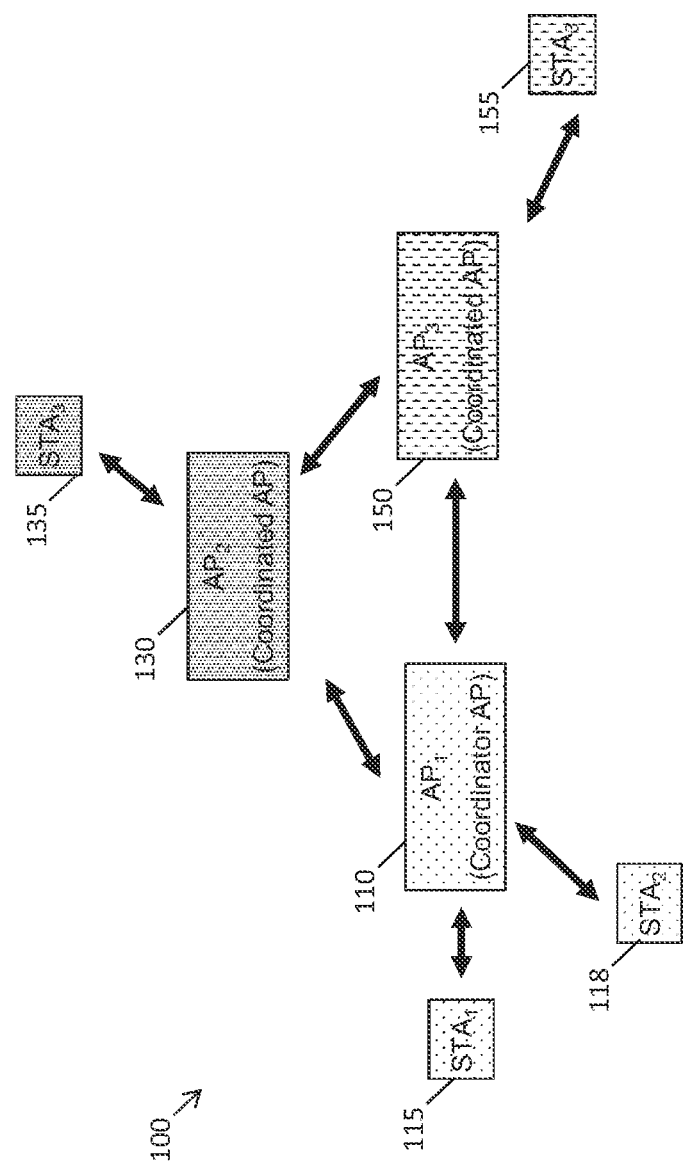
FIG. 1 illustrates an example of a network environment in which embodiments of the present disclosure may be implemented.

FIG. 1 illustrates an example of a network environment in which embodiments of the present disclosure may be implemented.

The illustrated network environment comprises an enhanced multiple EHT AP coordination system 100. The system contains three neighbouring APs 110, 130 and 150 implementing the multi-AP technology. In the present disclosure, AP 110, AP 130 and AP 150 are also referred to, respectively, as AP1, AP2 and AP3.

Non-AP STAs are associated with the neighbouring APs 110, 130 and 150. In the illustrated example, non-AP STAs 115 and 118 are associated with AP 110, non-AP STA 135 is associated with AP 130 and non-AP STA 155 is associated with AP 150.

The APs 110, 130 and 150 form a multi-AP group consisting in a set of APs having common features. In particular, they have the same Extended Service Set (ESS) and are close enough to each other to communicate. The APs may operate over a same channel (corresponding to all or part of the operational channel) and thus coordination is need to avoid interference. A multi-AP group is either static or updated each time one AP of the group gains access to the medium. It is assumed that each AP of a multi-AP group knows at any time the composition (the list of APs) of the Multi-AP group. In other words, the APs are able to identify each other.

It is assumed that AP 110 has gained access to the medium for a specific duration (COORD_TXOP) on specific operational channels (COORD_CHANNELS), and then has taken a role of coordinator for initiating a multi-AP transmission, i.e. AP 110 performs a time/frequency resources sharing within the duration COORD_TXOP and over the channels COORD_CHANNELS between the APs of the Multi-AP group. Other members of the Multi-AP group (APs 130 and 150) are referred to as coordinated APs. For example, the duration COORD_TXOP is equal to 2 ms and the channels COORD_CHANNELS correspond to an operational bandwidth of 80 MHz made of four 20 MHz channels.

FIGS. 2a, 2b and 2c illustrate examples of Time/Frequency resources sharing schemes that can be envisaged in an enhanced multiple AP coordination system, in accordance with one or more example embodiments of the present disclosure.

FIG. 2a illustrates a coordinated OFDMA scheme/sharing 200. The coordinator AP shares frequency resource chunks over the channels COORD_CHANNELS with coordinated APs for the entire duration COORD_TXOP. Preferably, a frequency resource chunk is equal to 20 MHz so that an AP may reproduce legacy operations with its associated stations. In the illustrated example, coordinator AP1 (110) allocates for itself resources corresponding to a frequency band 201 (referred to as AP1_COORD_CHANNELS) during a duration (referred to as AP1_COORD_TXOP) equal to COORD_TXOP. Coordinator AP1 (110) also allocates for coordinated AP2 (130) resources corresponding to a frequency band 202 (referred to as AP2_COORD_CHANNELS) during a duration (referred to as AP2_COORD_TXOP) equal to COORD_TXOP, and allocates for coordinated AP3 (150) resources corresponding to a frequency band 203 (referred to as AP3_COORD_CHANNELS) during a duration (referred to as AP3_COORD_TXOP) equal to COORD_TXOP.

FIG. 2b illustrates a coordinated TDMA scheme/sharing 230. The coordinator AP shares the entire frequency band (COORD_CHANNELS) in time. In the illustrated example, coordinator AP1 (110) allocates for itself resources corresponding to a frequency band AP1_COORD_CHANNELS equal to COORD_CHANNELS during a time period AP1_COORD_TXOP 231 (e.g. 1 ms). Coordinator AP1 (110) also allocates for coordinated AP2 (130) resources corresponding to a frequency band AP2_COORD_CHANNELS equal to COORD_CHANNELS during a time period AP2_COORD_TXOP 232 (e.g. 0.4 ms), and allocates for coordinated AP3 (150) resources corresponding to a frequency band AP3_COORD_CHANNELS equal to COORD_CHANNELS during a time period AP3_COORD_TXOP 233 (e.g. 0.6 ms).

FIG. 2c illustrates a coordinated OFDMA/TDMA scheme/sharing 260. In the illustrated example, coordinator AP1 (110) allocates for itself resources corresponding to a frequency band AP1_COORD_CHANNELS equal to a portion (preferably multiple of 20 MHz) of COORD_CHANNELS during a duration AP1_COORD_TXOP equal to COORD_TXOP. Coordinator AP1 (110) also allocates for coordinated AP2 (130) resources corresponding to a frequency band AP2_COORD_CHANNELS equal to a portion (preferably multiple of 20 MHz) of COORD_CHANNELS during a duration AP2_COORD_TXOP 262 (e.g. 1 ms) and allocates for coordinated AP3 (150) resources corresponding to a frequency band AP3_COORD_CHANNELS equal to a portion (preferably multiple of 20 MHz) of COORD_CHANNELS during a duration AP3_COORD_TXOP 263 (e.g. 1 ms).

Note that a coordinator AP allocates time/frequency resources at AP level. It means that the coordinator AP doesn't allocate Resource Units (RUs) directly for stations associated with the coordinated APs. It remains the responsibility of the coordinated APs to allocate RUs for their associated STAs. In the following, resource allocation performed by the coordinator AP for sharing resources between APs is referred to as inter-AP resource allocation or coordinated AP (CAP) resource allocation, and resource allocation performed by an AP for sharing resources with its associated stations is referred to as intra-AP resource allocation. The inter-AP resource allocation may include for a given AP one or more of the following parameters: allocated channels/subchannels, allocated duration, starting and ending times of the allocated duration.

Figure 3:
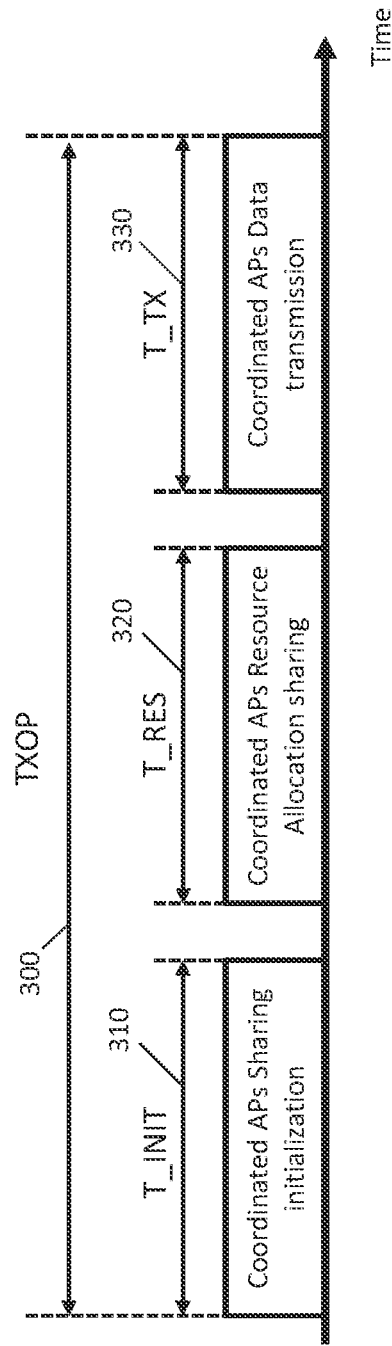
FIG. 3 illustrates a Multi-AP transmission which can be operated in an enhanced multiple AP coordination system, in accordance with one or more example embodiments of the present disclosure.

FIG. 3 illustrates a Multi-AP transmission which can be operated in an enhanced multiple AP coordination system, in accordance with one or more example embodiments of the present disclosure.

Once gaining the medium by an AP (referred to as coordinator AP), a multi-AP transmission may be launched over the channel COORD_CHANNELS for the duration COORD_TXOP 300.

The transmission is divided in 3 phases: a first phase 310 referred to as coordinated APs (CAP) sharing initialization phase, next a second phase 320 referred to as CAP Resource Allocation sharing phase and finally a third phase 330 referred to as CAP Data transmission phase.

Phase 310 corresponds to the sharing initialization phase and has two functions. During this phase, the coordinator AP indicates/signals to coordinated APs that it gained the medium over the channel COORD_CHANNELS for a duration COORD_TXOP and is ready to initiate a multi-AP transmission. Optionally, it may request a response from the coordinated APs in order to know which coordinated APs intend to participate in the multi-AP transmission. Moreover, it may also request the resource needs of each coordinated AP which has the intention to participate. Phase 310 is described in more details according to one implementation with reference to FIG. 4.

Phase 320 corresponds to the CAP Resource Allocation sharing phase. During this phase, the coordinator AP transmits for each coordinated AP the CAP resource Allocation corresponding for example to the allocated subchannels (preferably multiple of 20 MHz), allocated TXOP duration and Transmission start time. In other words, each coordinated APi receives the following parameters: APi_COORD_CHANNELS, APi_COORD_TXOP and APi_COORD_START. Phase 320 is described in more details according to one implementation with reference to FIG. 10.

Phase 330 corresponds to the CAP Data transmission phase. During this phase, according to the received CAP resource Allocation, each APi (coordinator AP and each coordinated AP) transmits data on its respective allocated subchannels APi_COORD_CHANNELS for the allocated TXOP duration APi_COORD_TXOP at the transmission start time APi_COORD_START. In other words, the coordinated AP computes its Intra-AP Resource Allocation in order to schedule the DL and UL transmissions to its associated non-AP stations under the constraints of the CAP (inter-AP) resource Allocation.

According to an embodiment of the invention, phase 310 is omitted. In such a case, the coordinator AP computes the coordinated APs resource Allocation by considering all APs of AP transmission. For instance, the coordinator AP may first allocate to itself resources according to its resource needs and then allocate uniformly the rest of available resources between all the coordinated APs of the multi-AP group. Advantageously, as no messages are exchanged during the initialization phase, bandwidth is saved and processing time is reduced for the coordinator APs. On the other hand, omitting phase 310 may result into a sub-optimal resource allocation, e.g. in case where resources are allocated for an AP that may not have the intention to participate in the multi-AP transmission.

Figure 4:
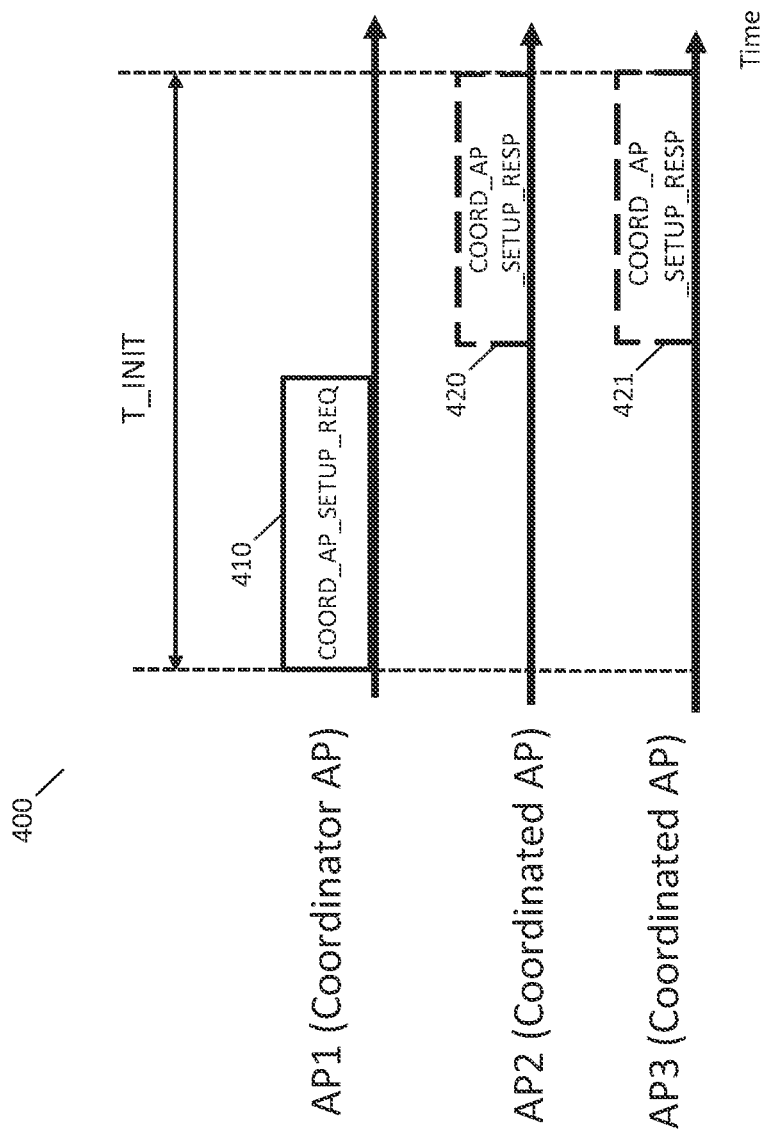
FIG. 4 illustrates the coordinated APs sharing initialization phase 400 which can be operated in an enhanced multiple AP coordination system, in accordance with one or more example embodiments of the present disclosure.

FIG. 4 illustrates the coordinated APs sharing initialization phase 400 which can be operated in an enhanced multiple AP coordination system, in accordance with one or more example embodiments of the present disclosure.

First, the coordinator AP indicates/signals to coordinated APs that it gained the medium over the channel COORD_CHANNELS for a duration COORD_TXOP and is ready to initiate a multi-AP transmission. It is performed by the sending of a frame 410 referred to as COORD_AP_SETUP_REQ.

Frame COORD_AP_SETUP_REQ is basically a non-high throughput (non-HT) duplicate (DUP) frame meaning that its transmission is duplicated over two or more 20 MHz channels which allows a station in a non-HT basic service set (BSS) on any one of the 20 MHz channels to receive the transmission.

According to an embodiment of the invention, the frame COORD_AP_SETUP_REQ 410 is a beacon or probe response frame with a dedicated subfield indicating that it is sent by an AP coordinator. A frame format according to one implementation is described with reference to FIG. 5a or 5b.

According to another embodiment of the invention, the frame COORD_AP_SETUP_REQ 410 is a non-HT DUP Trigger frame with a dedicated subfield indicating that it is a frame sent by an AP coordinator for initiating a multi-AP transmission. A frame format according to one implementation is described with reference to FIG. 6.

According to some embodiments of the invention, dedicated frames 420 and 421 referred to as COORD_AP_SETUP_RESP frames need to be sent by the APs of the Multi-AP group which have the intention to participate to the Multi-AP transmission. Those APs are here considered coordinated APs. In the present disclosure, three response procedures are described:

For the first one, the coordinator AP1 110 doesn't expect a response (COORD_AP_SETUP_RESP frame) from any APs of the Multi-AP group. In such a case, no frame COORD_AP_SETUP_RESP is sent by any Coordinated AP.

For the second one, the coordinator AP1 110 requests APs of the multi-AP group which have the intention to participate to the Multi-AP transmission to send a response. In such a case, a frame COORD_AP_SETUP_RESP 420 is sent by AP2 130 to AP1 110 and a frame COORD_AP_SETUP_RESP 421 is sent by AP3 150 to AP1 110.

For the third one, the coordinator AP1 110 requests explicitly a report about the resource needs (referred to as coordinated AP Report, or CAP Report) from the coordinated APs of the Multi-AP group which have the intention to participate to the Multi-AP transmission. In such a case, a frame COORD_AP_SETUP_RESP 420 is sent by AP2 130 including its CAP Report to AP1 110 and a frame COORD_AP_SETUP_RESP 421 is sent by AP3 150 including its CAP Report to AP1 110.

Figure 7:
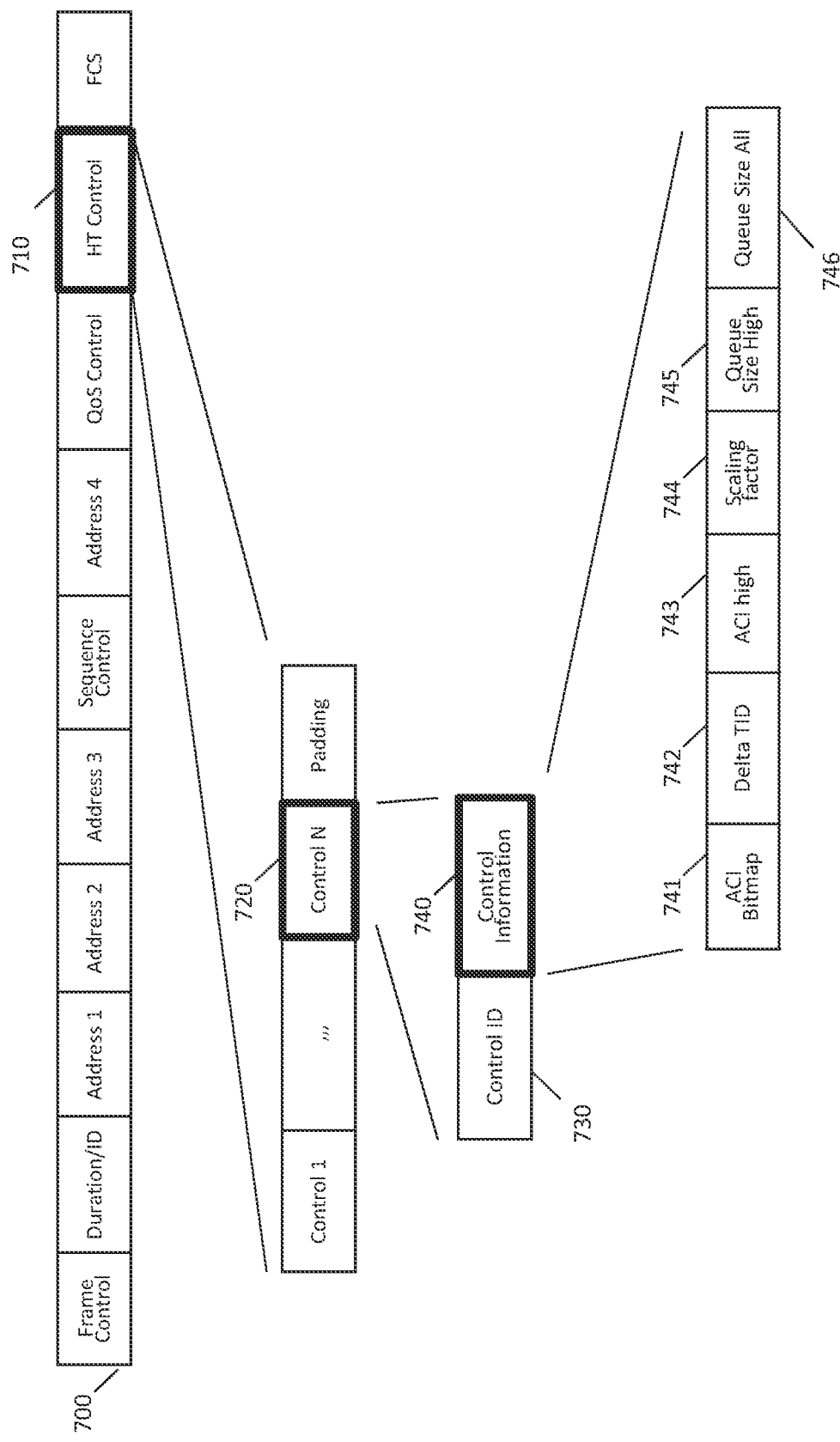
FIG. 7 illustrates a frame format relative to frame COORD_AP_SETUP_RESP including a coordinated APs Report, in accordance with one or more example embodiments of the present disclosure.
Figure 8:
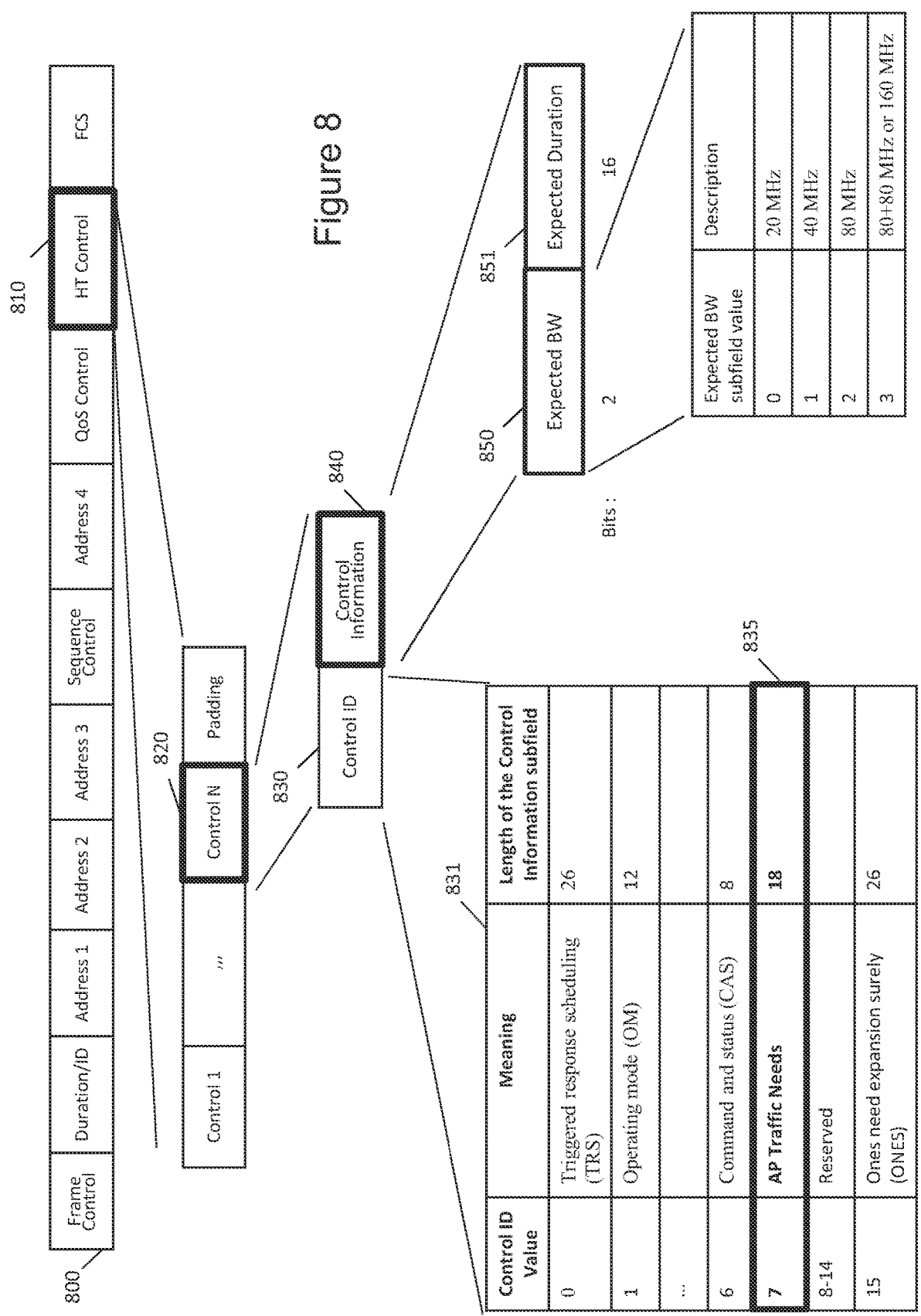
FIG. 8 illustrates a frame format relative to frame COORD_AP_SETUP_RESP including a coordinated APs Report based on a Frequency/Temporal resource request, in accordance with one or more example embodiments of the present disclosure.
Figure 9:
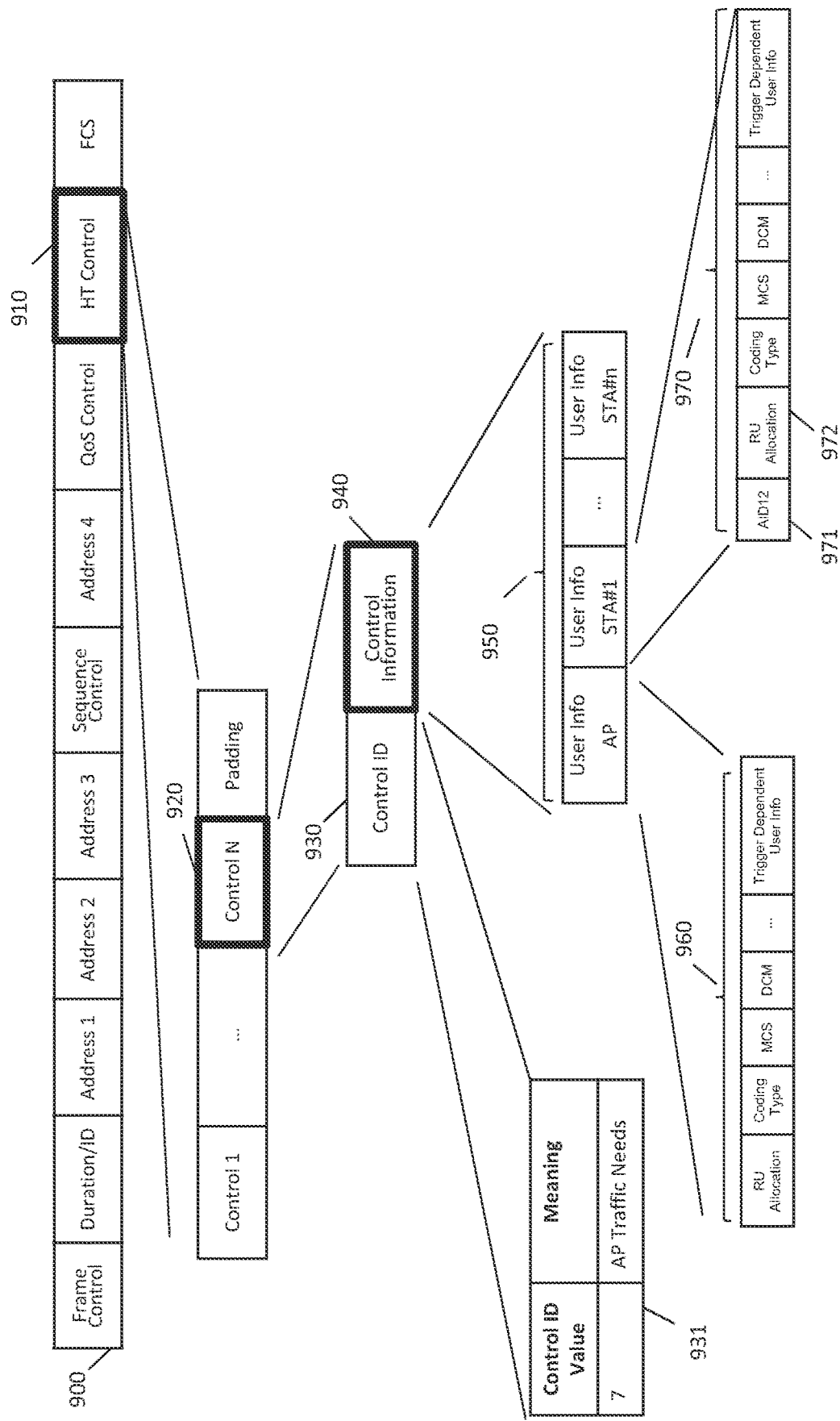
FIG. 9 illustrates a frame format relative to frame COORD_AP_SETUP_RESP including a coordinated APs Report based on a Resource Unit allocation request, in accordance with one or more example embodiments of the present disclosure.

According to embodiments of the invention, three implementations of the coordinated APs Reports are described with reference to FIGS. 7, 8 and 9. More precisely, FIG. 7 illustrates a frame format relative to frame COORD_AP_SETUP_RESP including a coordinated APs Report based on a Buffer Status report. FIG. 8 illustrates a frame format relative to frame COORD_AP_SETUP_RESP including a coordinated APs Report based on a Frequency/Temporal resource request. And FIG. 9 illustrates a frame format relative to frame COORD_AP_SETUP_RESP including a coordinated APs Report based on a RU allocation request.

Figure 5A:
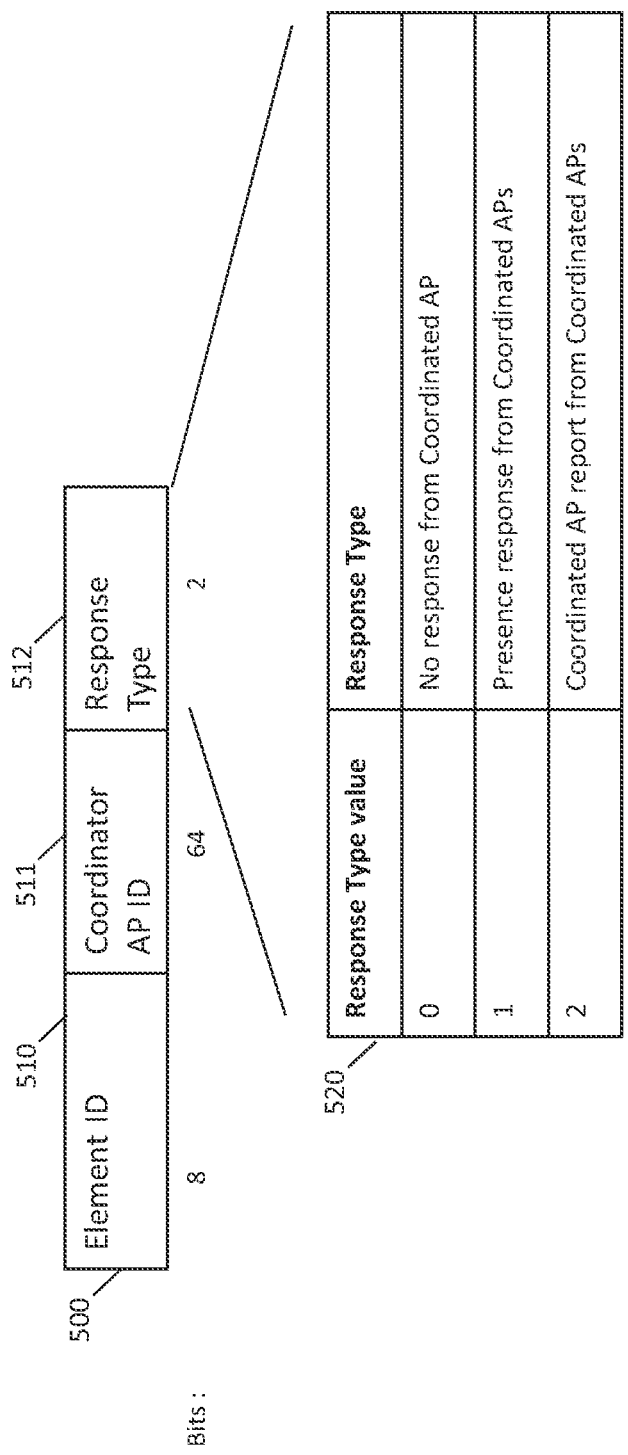
FIGS. 5a and 5b illustrate two frame formats relative to the frame COORD_AP_SETUP_REQ based on a beacon frame, in accordance with one or more example embodiments of the present disclosure.
Figure 5B:
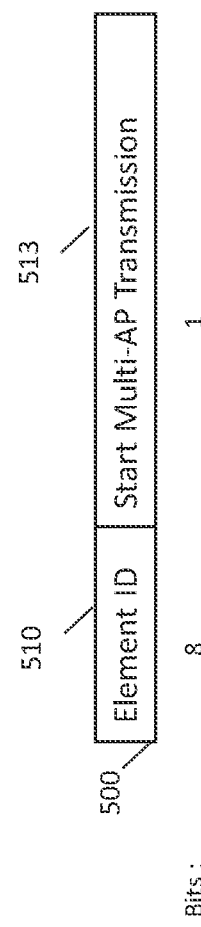

FIGS. 5a and 5b illustrate two frame formats relative to the frame COORD_AP_SETUP_REQ based on a beacon frame, in accordance with one or more example embodiments of the present disclosure. The two frame formats can be used in combination.

According to an embodiment of the invention, a new information element 500 relative to Multi-AP, referred to as Multi-AP element, is defined. The Multi-AP element may be set optional in a beacon frame, such as the frame COORD_AP_SETUP_REQ previously described.

According to a first embodiment, illustrated by FIG. 5a, the Multi-AP element 500 contains three subfields: An Element ID subfield 510, a coordinator AP ID subfield 511 and a Response Type subfield 512.

The Element ID subfield 510 identifies the element as a Multi-AP element. It may take a value in the range 245-254, so far reserved in 802.11. For the purpose of illustration, the value 246 is chosen in the embodiments of the invention.

The coordinator AP ID subfield 511 corresponds to an identifier of the coordinator AP. Preferably, it is equal to the BSSID of the coordinator AP.

The Response type subfield 512 indicates the response type expected by the coordinator AP from APs of the multi-AP group. Three response types may be defined as illustrated by the tab 520.

A first response type indicates that the coordinator AP doesn't expect a response (COORD_AP_SETUP_RESP frame) from any AP of the Multi-AP group. For the purpose of illustration, the encoding value is 0.

A second response type indicates that the coordinator AP requests the APs of the multi-AP group which have the intention to participate to the Multi-AP transmission to send a response. Each response is contained in a dedicated COORD_AP_SETUP_RESP frame. For the purpose of illustration, the encoding value is 1.

A third response type indicates that the coordinator AP requests explicitly a CAP Report (corresponding to the resource needs) of APs of the Multi-AP group which have the intention to participate to the Multi-AP transmission. Each CAP Report is contained in a dedicated COORD_AP_SETUP_RESP frame. For the purpose of illustration, the encoding value is 2.

According to a second embodiment (in combination or alternate to the first embodiment), illustrated by FIG. 5b, the Multi-AP element 500 contains 2 subfields: An Element ID subfield 510 and a Start Multi-AP Transmission subfield 513. The Start Multi-AP Transmission subfield 513 corresponds to a Boolean set by an AP for indicating that it becomes a coordinator AP, for example when set to 1. By default, its value is 0.

Figure 6:
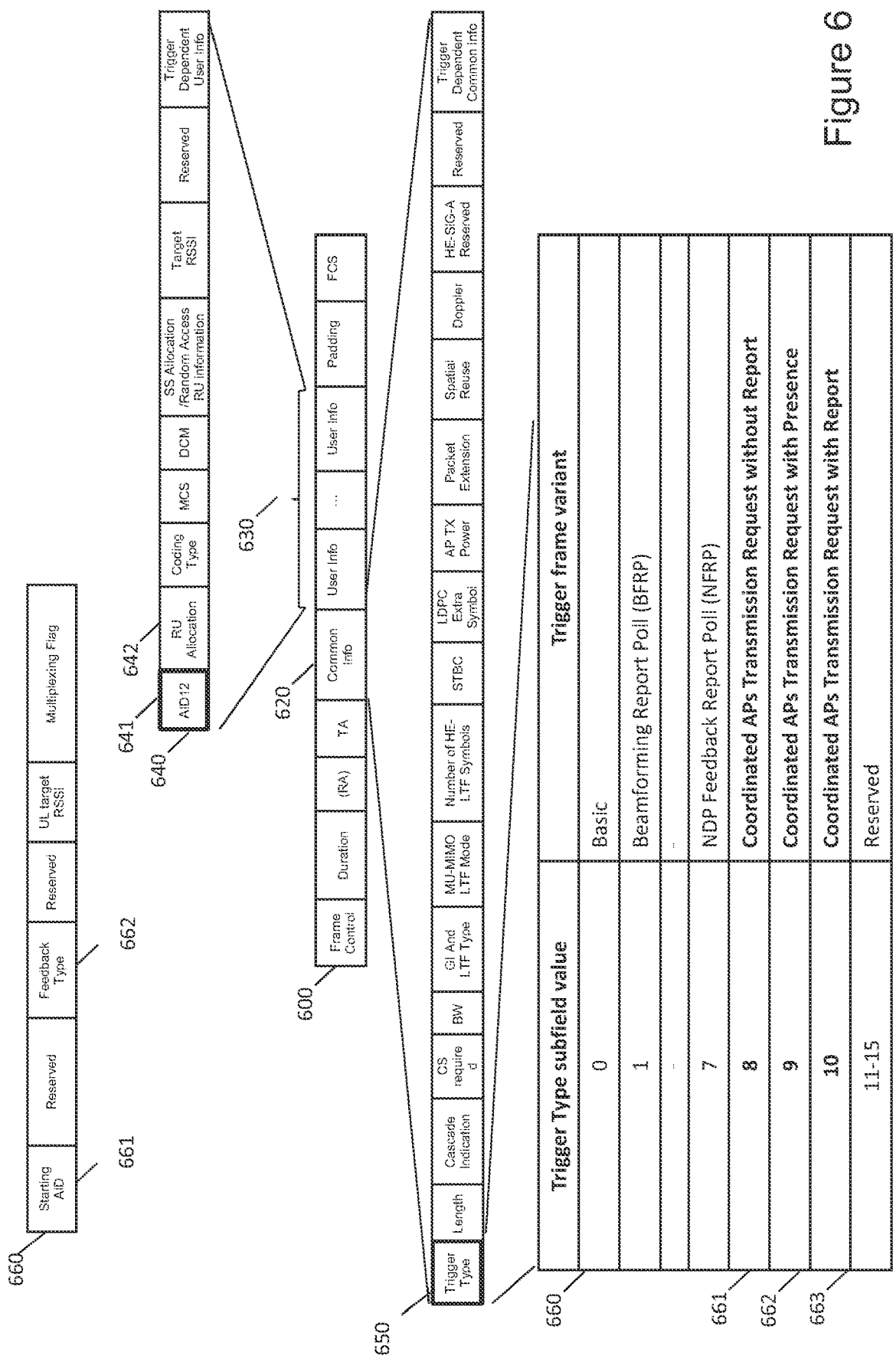
FIG. 6 illustrates a frame format relative to the frame COORD_AP_SETUP_REQ based on a non-HT DUP Trigger frame, in accordance with one or more example embodiments of the present disclosure.

FIG. 6 illustrates a frame format relative to the frame COORD_AP_SETUP_REQ based on a non-HT DUP Trigger frame, in accordance with one or more example embodiments of the present disclosure.

A trigger frame contains several fields and in particular it includes a single Common Info field and a plurality of User Info fields.

The single Common Info field contains in particular a 4-bit Trigger Type subfield (the first 4 bits in the Common Info field). The Trigger Type subfield identifies the Trigger frame variant and several Trigger Type subfield values have been defined in the 802.11ax standard. In the version D6.0 of the standard, values between 8 and 15 are reserved and may be used for defining new trigger frame variant.

For the present disclosure, new trigger frame variants are defined corresponding each one to a specific frame COORD_AP_SETUP_REQ. In other words, a frame COORD_AP_SETUP_REQ 600 is a trigger frame identified by a new trigger frame variant defined within the Trigger Type subfield 650 of the Common Info field 620.

A first new trigger frame variant is defined corresponding to a frame COORD_AP_SETUP_REQ requesting no response from any APs of the Multi-AP group. For the purpose of illustration, the Trigger Type subfield value for such a frame COORD_AP_SETUP_REQ is 8.

A second new trigger frame variant is defined corresponding to a frame COORD_AP_SETUP_REQ requesting explicitly a response of presence for the APs of the Multi-AP group which have the intention to participate to the Multi-AP transmission. Each response is contained in a dedicated frame COORD_AP_SETUP_RESP. For the purpose of illustration, the Trigger Type subfield value for such a frame COORD_AP_SETUP_REQ is 9.

A third new trigger frame variant is defined corresponding to a frame COORD_AP_SETUP_REQ requesting explicitly a coordinated APs Report (corresponding to the resource needs) of APs of the Multi-AP group which have the intention to participate to the Multi-AP transmission. Each coordinated APs Report is contained in a dedicated frame COORD_AP_SETUP_RESP. For the purpose of illustration, the Trigger Type subfield value for such a frame COORD_AP_SETUP_REQ is 10.

According to several embodiments of the invention, all configurations are possible in the specifications of the new trigger frames. Indeed, only one trigger frame variant may be used amongst the three, or two of them, or the three ones.

For the second and third frame variant, the plurality of User Info fields 630 may be used in order to allocate resources for the response of the coordinated APs. More precisely, a User Info field 640 includes information corresponding to attributes of data that the respective stations need to follow for participating in the MU UL PPDU transmission. In particular, it contains an AID12 subfield 641 which carries the 12 LSBs of the Association Identifier (AID) of the station for which the user info filed is intended. In such a case, the considered RU is considered as scheduled RU. On the other hand, an AID12 subfield 641 equal to 0 indicates a random RU.

In the context of the invention, according to a first embodiment, the trigger frame 600 includes a plurality of User Info fields 630 for which the AID12 subfield 641 is set to 0 for each one. According to a second embodiment, the trigger frame 600 contains a list of N User Info fields 630, N being the number of AP included in the multi-AP group less one (corresponding to the coordinator AP). Each User Info fields 640 is dedicated to an AP included in the multi-AP group and is identified by the AID12 subfield 641, set to a value corresponding to a specific AID given to the AP of the multi-AP group. Moreover, for each User Info fields, the RU Allocation subfield 642 contains the RU allocated to the associated AP for which this one must send its response.

Note that the AID of a station is a value assigned by an Access Point to a non-AP station during the association procedure that represents the 16-bit ID of a STA. The MU UL access scheme uses the 12 LSBs of the AID of the STA (referred to as AID12) of the station in order to indicate the UL RU assignments in the trigger frame. Values between 2008 and 4095 are authorized and more specially the value between 2008 and 2044 are reserved. Consequently, according to embodiments of the invention, a specific AID may be assigned for each APs of the multi-AP group.

For the second frame variant, according to another embodiment, the coordinated APs may also use a NDP (Null Data Packet) feedback report procedure for indicating their intention to participate in the multi-AP transmission. In such case, the format of the User Info field of the trigger frame 650 is different and corresponds to 660. In particular, the User Info field contains a Starting AID subfield 661 and a Feedback Type subfield 662. The Starting AID subfield 661 defines the first AID of the range of AIDs that are scheduled to respond to the NFRP Trigger frame and in the context of the present disclosure corresponds to the first specific AID assigned to the coordinated AP of the range of specific AIDs that are scheduled. The Feedback Type subfield 650 specifies the type of the feedback. Only the value 0 is already specified and corresponds to a response of a resource request. According to an embodiment of the invention, a new value is defined (for illustrative purpose set to 1) and corresponds to a response of a frame COORD_AP_SETUP_REQ.

FIG. 7 illustrates a frame format relative to frame COORD_AP_SETUP_RESP including a coordinated APs Report, in accordance with one or more example embodiments of the present disclosure.

Frame COORD_AP_SETUP_RESP corresponds to a 802.11 frame sent by a AP including a HE variant HT Control field 710. The HE variant HT Control field contains a list of Control subfields. Each control subfield contains a Control ID subfield and a Control Information subfield. More precisely, the Control ID subfield indicates the type of information carried in the Control Information subfield. The values of the Control ID subfield and the associated length of the Control Information subfield may be conventional.

A control subfield is dedicated to the Buffer Status Reports (BSR) in order to deliver buffer status information typically used for UL MU operation. It is referred to as BSR Control subfield. In particular, it is identified by a Control ID subfield set to 3.

According to an embodiment of the invention, a frame COORD_AP_SETUP_RESP corresponds to an 802.11 frame 700 including a HE variant HT Control subfield 710 which contains a BSR Control subfield 720 including a Control ID subfield 730 set to 3 and a Control Information subfield 740. In particular, it contains an ACI Bitmap subfield 741, a Delta TID subfield 742, an ACI high subfield 743, a Scaling Factor subfield 744, a Queue Size High subfield 745 and a Queue Size All subfield 746.

The ACI Bitmap subfield 741 indicates the access categories for which the buffer status is reported. Each bit of the ACI Bitmap subfield is set to 1 to indicate the buffer status of the corresponding AC, and set to 0 otherwise. If the ACI Bitmap subfield is 0 and the Delta TID subfield is 3 it indicates that there is buffered traffic for all 8 TIDs.

The Delta TID subfield 742, together with the values of the ACI Bitmap subfield, indicate the number of TIDs for which the AP is reporting the buffer status.

The ACI High subfield 743 indicates the ACI of the AC for which the BSR is indicated in the Queue Size High subfield.

The Scaling Factor subfield 744 indicates the unit SF, in octets, of the Queue Size High and Queue Size All subfields.

The Queue Size High subfield 745 indicates the amount of buffered traffic, in units of SF octets, for the AC identified by the ACI High subfield that is intended for the AP identified by the receiver address of the frame containing the BSR Control subfield.

The Queue Size All subfield 746 indicates the amount of buffered traffic, in units of SF octets, for all the ACs identified by the ACI Bitmap subfield that is intended for the AP identified by the receiver address of the frame containing the BSR Control subfield.

FIG. 8 illustrates a frame format relative to frame COORD_AP_SETUP_RESP including a coordinated APs Report based on a Frequency/Temporal resource request, in accordance with one or more example embodiments of the present disclosure.

Frame COORD_AP_SETUP_RESP corresponds to an 802.11 frame including a HE variant HT Control subfield. The HE variant HT Control subfield contains a list of Control subfields. Each Control subfield contains a Control ID subfield and a Control Information subfield. More precisely, the Control ID subfield indicates the type of information carried in the Control Information subfield. The values of the Control ID subfield and the associated length of the Control Information subfield may be the same as those defined in 802.11ax standard, D6.0.

According to an embodiment of the invention, a new value is added for specifying a control subfield specific to AP Traffic Needs, referred to as AP Traffic Needs Control subfield 820. For the purpose of illustration, the value 7 has been selected for identifying the AP Traffic Needs Control subfield 820 (tab 837, line 835).

Moreover, the AP Traffic Needs Control subfield 820 contains a specific Control Information subfield 840. The Control Information subfield 840 contains two subfields, an Expected BW subfield 850 and an Expected Duration subfield 851. The Expected BW subfield 850 is coded on 2 bits. A value of 0 indicates a value of bandwidth equal to 20 MHz, a value of 1 indicates a value of bandwidth equal to 40 Mhz, a value of 2 indicates a value of bandwidth equal to 80 Mhz and a value of 3 indicates a value of bandwidth equal to 80+80 Mhz or 160 Mhz. The Expected Duration subfield 851 is coded on 16 bits.

Finally, a Frame COORD_AP_SETUP_RESP corresponds to an 802.11 frame 800 including a HE variant HT Control subfield 810 which contains an AP Traffic Needs Control subfield 820.

FIG. 9 illustrates a frame format relative to frame COORD_AP_SETUP_RESP including a coordinated APs Report based on a Resource Unit allocation request, in accordance with one or more example embodiments of the present disclosure.

Frame COORD_AP_SETUP_RESP corresponds to an 802.11 frame sent by an AP including a HE variant HT Control subfield. The HE variant HT Control field contains a list of Control subfields. Each control subfield contains a Control ID subfield and a Control Information subfield. More precisely, the Control ID subfield indicates the type of information carried in the Control Information subfield. The values of the Control ID subfield and the associated length of the Control Information subfield may be the same as those defined in 802.11 ax standard, D6.0.

According to an embodiment of the invention, a new value is added for specifying a control subfield specific to AP Traffic Needs, referred to as AP Traffic Needs Control subfield 820. For the purpose of illustration, the value 7 has been selected for identifying the AP Traffic Needs Control subfield 920.

Moreover, the AP Traffic Needs Control subfield 920 contains a specific Control Information subfield 940. The Control Information subfield 940 contains a list of User Info Field 950. Among the list of User Info Field 950, a dedicated one is specific to the AP (960) and the others relative to the associated non-AP STAs associated to the AP (970).

The format of the User Info Field 960 corresponds also to the User Info fields format for a trigger frame excepted to AID12 subfield which is omitted. Moreover, it is placed in first position in the list of User Info Field 950.

The format of the User Info Field 970 relative to the associated non-AP STAs corresponds to the User Info fields format for a trigger frame. In particular, it contains an AID12 subfield 971 and a RU Allocation subfield 972.

Finally, a Frame COORD_AP_SETUP_RESP corresponds to an 802.11 frame 900 including a HE variant HT Control subfield 910 which contains an AP Traffic Needs Control subfield 920.

Figure 10:
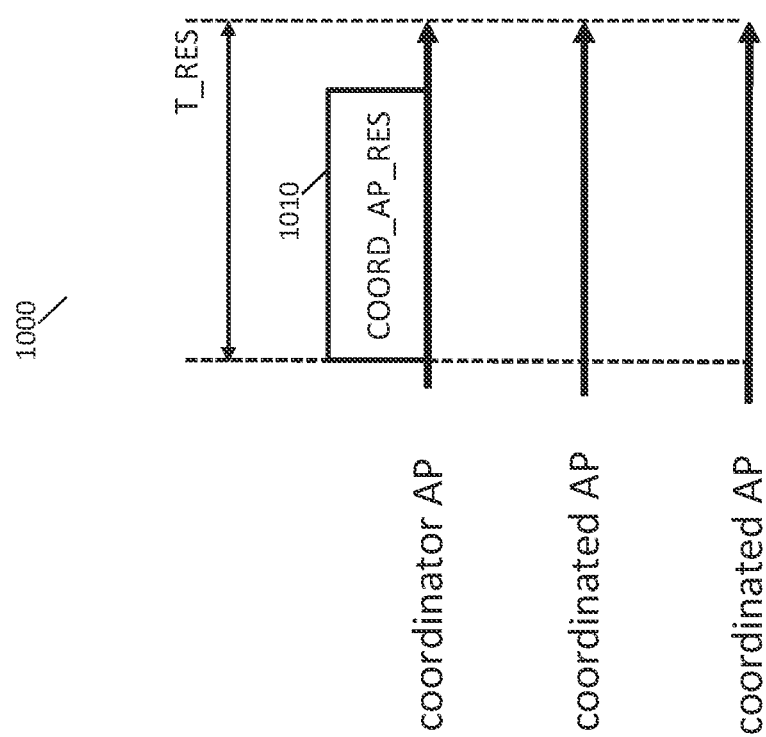
FIG. 10 illustrates the coordinated APs Resource Allocation phase which can be operated in an enhanced multiple AP coordination system, in accordance with one or more example embodiments of the present disclosure.

FIG. 10 illustrates the coordinated APs Resource Allocation phase 1000 which can be operated in an enhanced multiple AP coordination system, in accordance with one or more example embodiments of the present disclosure.

The coordinator AP transmits for each coordinated APs the coordinated APs resource Allocation corresponding to the allocated channels (multiple of 20 MHz), allocated TXOP duration, and Transmission start time. In other words, each coordinated APi receives the following parameters: APi_COORD_CHANNELS, APi_COORD_TXOP and APi_COORD_START.

According to a first embodiment of the invention, the coordinated APs resource Allocation is computed without feedback of the coordinated APs in terms of intention to participate to the Multi-AP transmission (and optionally their traffic needs). According to another embodiment of the invention, the coordinated APs resource Allocation is computed by considering feedbacks of the APs which have intention to participate to the Multi-AP transmission and optionally their Traffic needs. These feedbacks have been extracted from the frames COORD_AP_SETUP_RESP 420/421 sent by coordinated APs.

The coordinated APs resource Allocation is sent through a frame COORD_AP_RES 1010 intended to coordinated APs. At the current stage, no frame format is proposed by the prior-art. A frame format is described for frame COORD_AP_RES with reference to FIG. 11.

Figure 11:
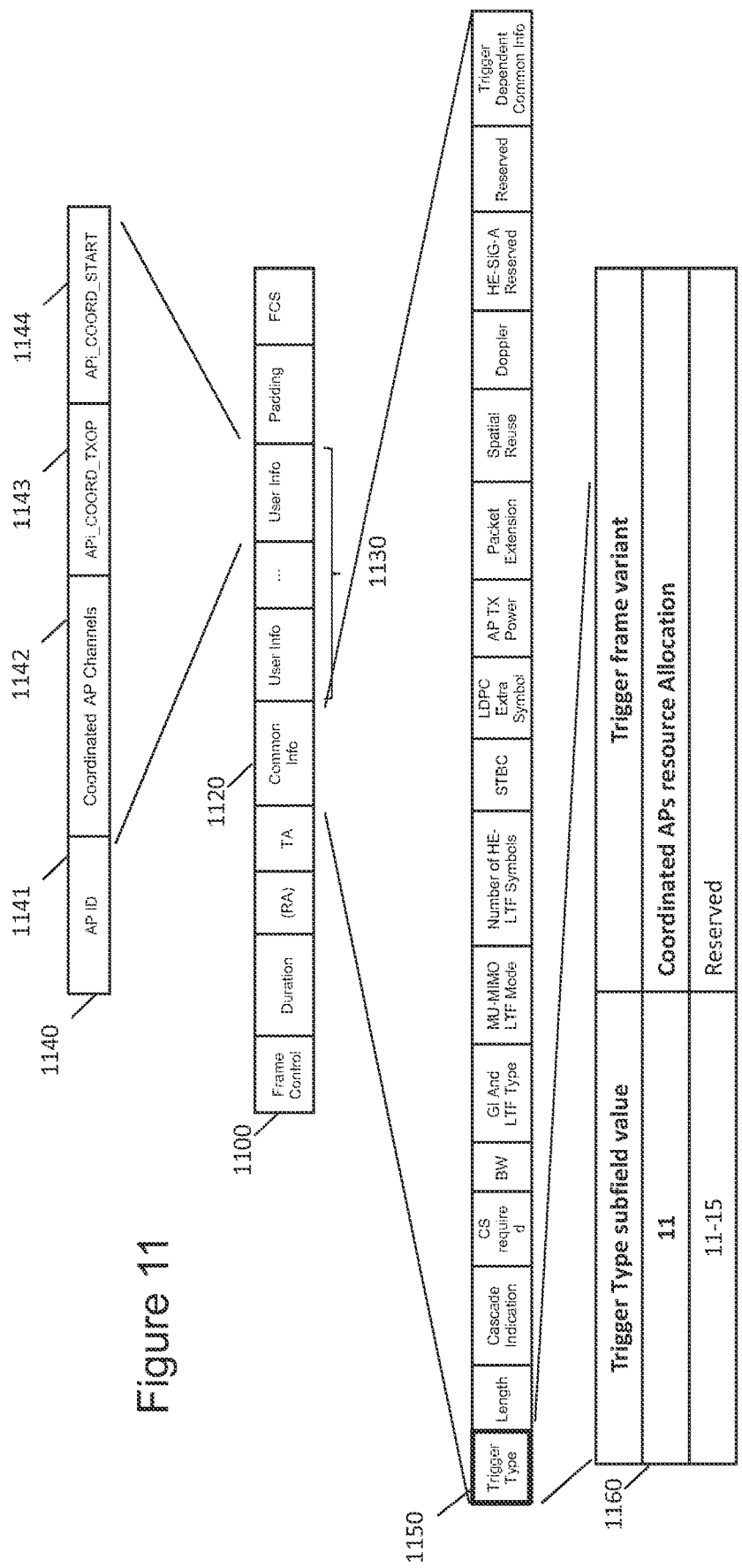
FIG. 11 illustrates a frame format relative to frame COORD_AP_RES based on a non-HT DUP Trigger frame, in accordance with one or more example embodiments of the present disclosure.

FIG. 11 illustrates a frame format relative to frame COORD_AP_RES based on a non-HT DUP Trigger frame, in accordance with one or more example embodiments of the present disclosure.

A trigger frame 600 contains several fields and in particular it includes a single "Common Info" field 620 and a plurality of "User Info" fields 630.

The single Common Info field contains in particular a 4-bit Trigger Type subfield (the first 4 bits in the "Common Info" field). The Trigger Type subfield identifies the Trigger frame variant and several Trigger Type subfield values are envisaged. In version D6.0 of 802.11ax standard, values between 8 and 15 are reserved and may be used for defining new trigger frame variant.

For the present disclosure, a new trigger frame variant is defined corresponding to a specific frame COORD_AP_RES. For the purpose of illustration, the Trigger Type subfield (1150) value for such a frame COORD_AP_RES is 11 (1160).

Frame COORD_AP_RES 1100 is consequently a trigger frame 1100 which contains a Common Info field 1120 for which the trigger type subfield 1150 is set to value 11. The other subfields of the Frame COORD_AP_RES 1100 are similar to the subfields of TF 600 excepted to the list of User Info field 1130. Indeed, a specific User Info field 1140 is specified for a frame COORD_AP_RES.

According to an embodiment of the invention, it contains an AP ID subfield 1141, a coordinated AP Channels subfield 1142, a coordinated AP TXOP subfield 1143 and an AP coordinated AP TX Start 1144. According to another embodiment of the invention, it contains only an AP ID subfield 1141 and a coordinated AP Channels subfield 1142. According to another embodiment of the invention, it contains only a coordinated AP TXOP subfield 1143 and a coordinated AP TX Start subfield 1144.

Figure 12:
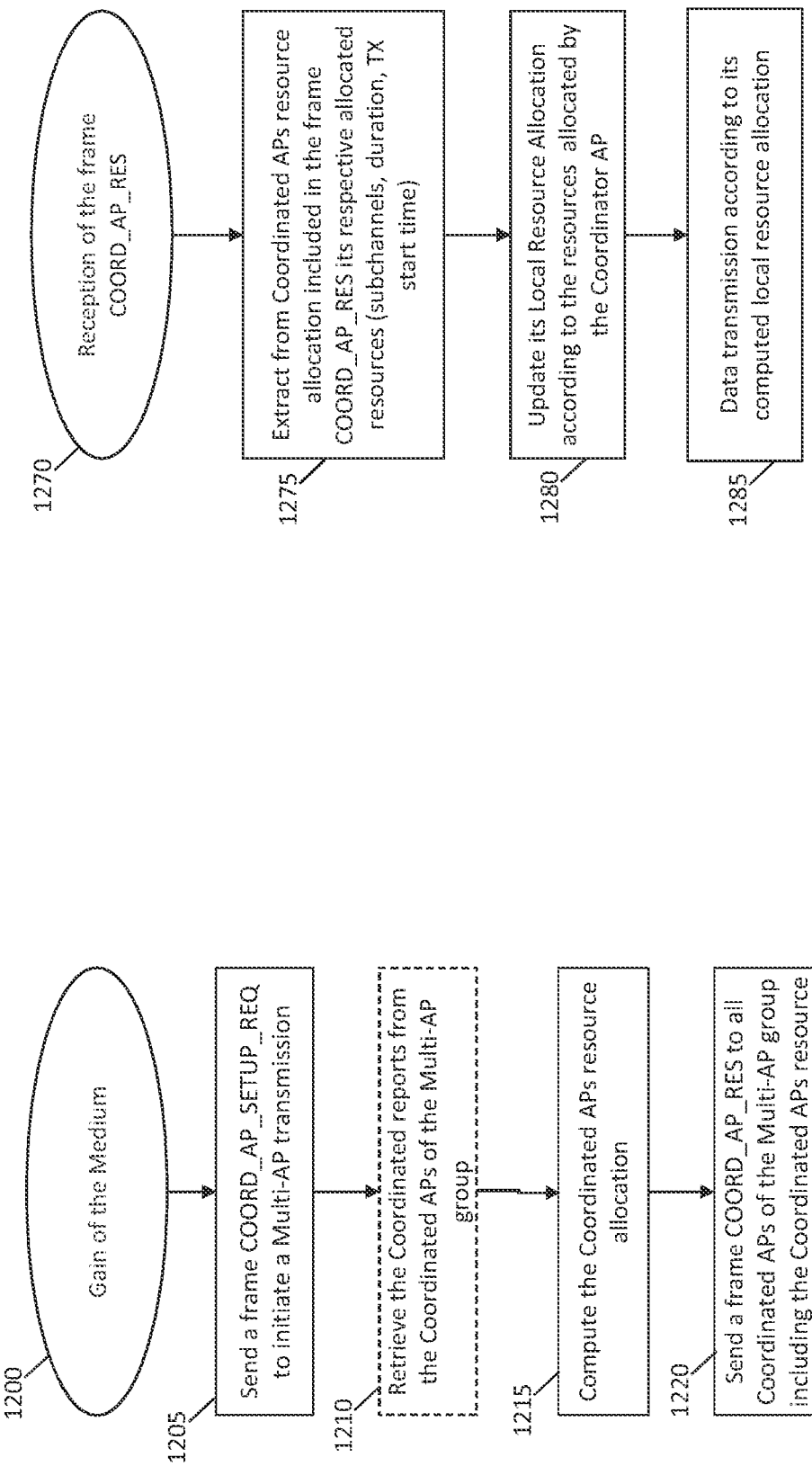
FIGS. 12a and 12b illustrate, using a flowchart, general steps operated by APs which can be operated in an enhanced multiple AP coordination system, in accordance with one or more example embodiments of the present disclosure.

FIGS. 12a and 12b illustrate, using a flowchart, general steps operated by APs which can be operated in an enhanced multiple AP coordination system, in accordance with one or more example embodiments of the present disclosure.

FIG. 12a illustrates the general steps performed by a coordinator AP for operating a Multi-AP Transmission.

At Step 1200, an AP of a multi-AP group gained the medium over the channel COORD_CHANNELS for a duration COORD_TXOP and is ready to initiate a multi-AP transmission. As such, it becomes during this duration the coordinator AP of the AP multi-group.

At step 1205, the coordinator AP sends a frame COORD_AP_SETUP_REQ to initiate the Multi-AP transmission.

According to an embodiment of the invention, the format of the frame COORD_AP_SETUP_REQ is based on a beacon frame as described with reference to FIG. 5a. It contains a Multi-AP Element 500 identified by an Element ID field set to 246. The coordinator AP ID subfield 511 is the identifier of the coordinator AP. According to an embodiment of the invention, it corresponds to the BSSID of the coordinator AP. According to another embodiment of the invention, it corresponds to a specific AID. The AID assignment for an AP procedure is out the scope of the invention. The Response type subfield 512 indicates the response type expected by the coordinator AP by APs of the multi-AP group. Its value is either 0, 1 and 2. The selection of this value is either fixed or dynamic. At the stage, it is out of scope of the invention.

According to another embodiment of the invention, the format of the frame COORD_AP_SETUP_REQ is based on a beacon frame as described with reference to FIG. 5b. It contains a Multi-AP Element 500 identified by an Element ID 510 subfield set to 246. It also contains a Start Multi-AP Transmission subfield 513 set to 1.

According to an embodiment of the invention, the format of the frame COORD_AP_SETUP_REQ is based on a non-HT DUP Trigger frame 600 as described with reference to FIG. 6. The selection of the trigger frame variant relative to multi-AP operation and corresponding to the response type expected by the coordinator AP is out of scope of the invention. According to the selected trigger frame variant, the Trigger Type subfield 650 of the Common Info field 620 is set to 8, 9 or 10. Moreover, the list of User Info fields 630 is updated. According to a first embodiment, the trigger frame 600 includes a plurality of User Info fields 630 for which the AID12 subfield 641 is set to 0 for each one. According to a second embodiment, the trigger frame 600 contains a list of N User Info fields 630, N being the number of AP included in the multi-AP group less one (corresponding to the coordinator AP). Each User Info fields 640 is dedicated to an AP included in the multi-AP group and is identified by the AID12 subfield 641, set to a value corresponding to a specific AID given to the AP of the multi-AP group. Moreover, for each User Info field, the RU Allocation subfield 642 is updated indicating the RU allocated to the associated AP that it must transmit its response (COORD_AP_RESP).

According to another embodiment the format of the frame COORD_AP_SETUP_REQ is based on a non-HT DUP Trigger frame corresponding to a NDP feedback report procedure. In such a case, the Trigger Type subfield 650 of the Common Info field 620 is set to value 7. As described in FIG. 6, the format of the User Info field of the frame COORD_AP_SETUP_REQ is specific. A User Info Field 660 contains in particular a Starting AID field 661 and a Feedback Type field 662. The Starting AID field 661 is set to the first AID of the range of specific AIDs given to the AP of the multi-AP group. The Feedback Type subfield 662 is set to 1.

Next, according to the response type expected by the coordinator AP, at step 1210 (optional), the coordinator AP may receive a set of frames COORD_AP_SETUP_RESP indicating the APs of the multi-AP group which have the intention to participate to the Multi-AP transmission and according to an embodiment of the invention containing in addition coordinated APs Report (corresponding to the resource needs).

Next, at step 1215, with or without feedbacks of the APs in terms of intention to participate to the Multi-AP transmission and optionally their Traffic needs, the coordinator AP computes a coordinated APs resource Allocation corresponding to the allocated channels (multiple of 20 MHz) and/or allocated TXOP duration and/or Transmission start time for each coordinated AP. Each coordinated APi receives the following parameters: APi_COORD_CHANNELS, APi_COORD_TXOP and APi_COORD_START.

According to several embodiments of the invention, the coordinated APs resource Allocation may rely on several Time/Frequency resources scheme/sharing as described in FIG. 2. According to an embodiment, the coordinated APs Resource Allocation is based on a coordinated OFDMA scheme/sharing as described in FIG. 2a. According to another embodiment, the coordinated APs Resource Allocation is based on a coordinated TDMA scheme/sharing as described in FIG. 2b. According to another embodiment, the coordinated APs resource Allocation is based on a coordinated OFDMA/TDMA scheme/sharing as described in FIG. 2c. According to another embodiment, the coordinated APs resource Allocation may be dynamic and may alternate between OFDMA, TDMA and OFDMA/TDMA scheme/sharing.

Next, at step 1220, coordinator AP sends a frame COORD_AP_RES to all coordinated APs of the Multi-AP group including the computed coordinated APs resource allocation. The format of the frame COORD_AP_RES 1100 is described with reference to FIG. 11. In particular the list of User Info field 1130 is constructed at step 1220. For each coordinated APi, the subfields of its corresponding user Info Field are set as following: the AP ID subfield 1141 is set to the specific AID of the coordinated APi, the coordinated AP Channels subfield 1141 is set to APi_COORD_CHANNELS, the coordinated AP TXOP subfield 1142 is set to APi_COORD_TXOP and the AP coordinated AP TX Start 1143 is set to APi_COORD_START. According to embodiment of the invention, it is not necessary to fulfil all subfields 1142, 1143 or 1144. For instance, for a coordinated APs resource Allocation based on a coordinated OFDMA, the coordinated AP TXOP subfield 1143 and coordinated AP TX Start subfield 1144 may be omitted. Similarly, for a coordinated APs resource Allocation based on a coordinated TDMA, the coordinated AP Channels subfield 1142 may be omitted.

FIG. 12b illustrates the general steps performed by a coordinated AP at a reception of a frame COORD_AP_RES.

At a reception of a frame COORD_AP_RES (stet 1270), the coordinated AP extracts (1275) from coordinated APs resource allocation included in the frame its respective allocated resources. More precisely, it extracts the User Info field 1130 for which the AP ID subfield 1141 corresponds to its specific AID and retrieves the available subfields, APi_COORD_CHANNELS and/or to APi_COORD_TXOP and/or APi_COORD_START.

Next, at step 1280 coordinated AP computes or updates its Intra-AP Resource Allocation according to (constrained by) the resources allocated by the coordinator AP given by the parameters APi_COORD_CHANNELS and/or to APi_COORD_TXOP and/or APi_COORD_START.

Next, at step 1285 starts its data transmission according to its computed intra-AP resource allocation.

Figure 13:
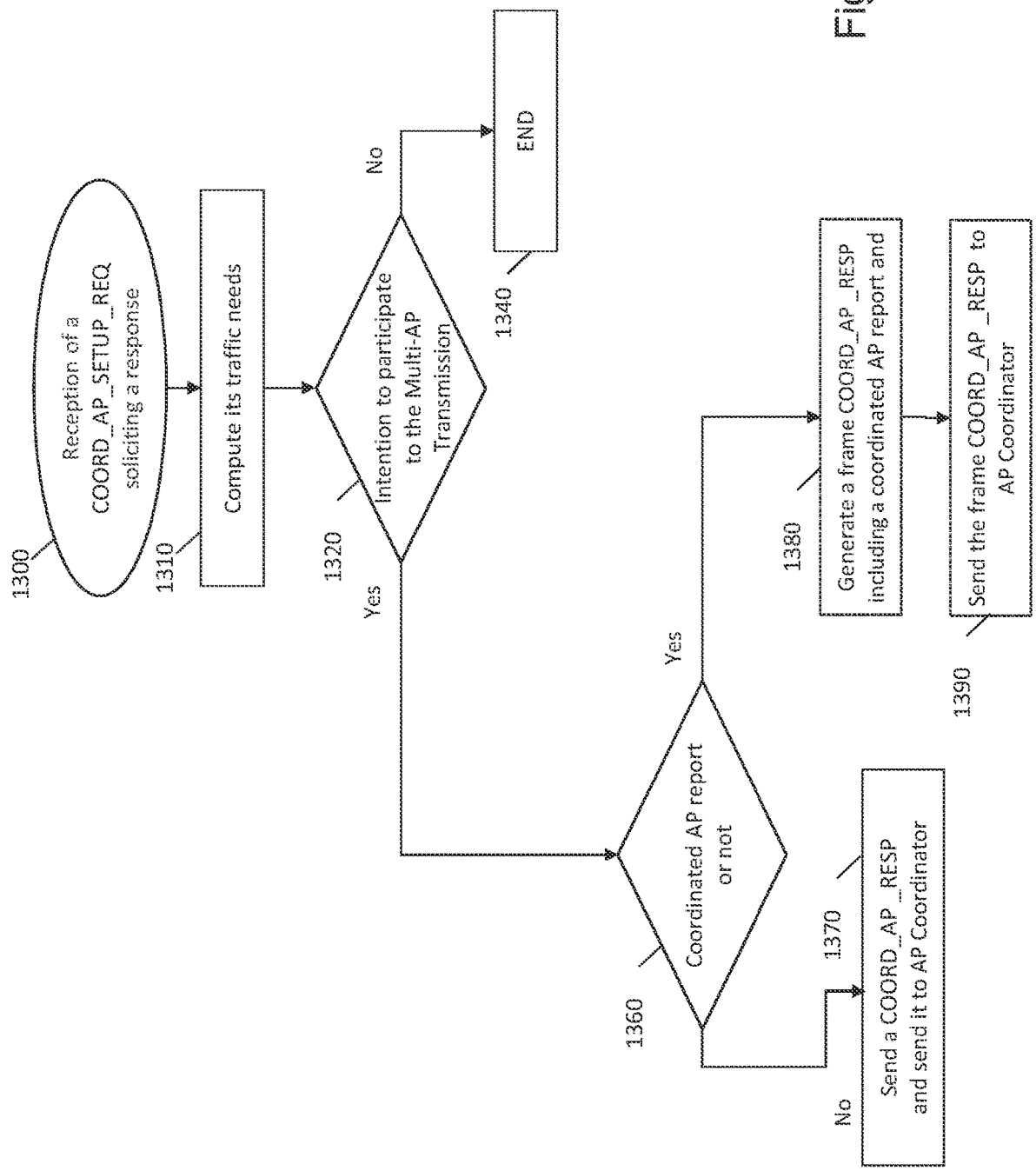
FIG. 13 illustrates the general steps performed by a coordinated AP at a reception of COORD_AP_SETUP_REQ soliciting a response, in accordance with one or more example embodiments of the present disclosure.

FIG. 13 illustrates the general steps performed by a coordinated AP at a reception of COORD_AP_SETUP_REQ soliciting a response, in accordance with one or more example embodiments of the present disclosure.

At the reception of a COORD_AP_SETUP_REQ soliciting a response (step 1300), an EHT decides or not whether it has the intention to participate or not.

First, at step 1310, the coordinated AP computes its traffic needs. Its computation is out of the scope of the invention but typically, it is based on the buffer status reports (BSRs) delivered by the non-AP STAs associated with the coordinated AP.

Next, at step 1320, from the computed traffic needs at step 1310, the coordinated AP decides or not whether it has the intention to participate in the multi-AP transmission operated by the coordinator AP. If yes, next step is 1360. If not, next step is 1340 corresponding to the end of the algorithm. The choice of intending or not according to the traffic needs is out of the scope of the invention but typically it depends on the traffic needs computed at step 1310.

Next, step 1360 checks whether a coordinated AP report needs to be generated or not. If yes, next step is 1380. If not, next step is 1370. The check is directly derived of the type of the frame COORD_AP_SETUP_REQ. According to an embodiment of the invention for which the frame COORD_AP_SETUP_REQ is based on a non-HT DUP Trigger frame as described with reference to FIG. 6, this step consists in reading the Trigger Type subfield value 650 of the Common Info field and if it is set to 9, the coordinated AP doesn't need to generate a coordinated AP report. But if it is set to 10, the coordinated AP needs to generate a coordinated AP report. According to another embodiment of the invention for which the frame COORD_AP_SETUP_REQ is based on a beacon frame as described with reference to FIG. 5, this step consists in reading the "Response type" value 512 of the Multi-AP Element 500. If it is set to 1, the coordinated AP doesn't need to generate a coordinated AP report. But if it is set to 2, the coordinated AP needs to generate a coordinated AP report.

At step 1370 a COORD_AP_RESP frame is sent intended to the coordinator AP indicating that it has the intention to participate to the Multi-AP transmission. For instance, a COORD_AP_RESP corresponds to an HE TB feedback NDP as specified IEEE 802.11ax, version D6.0.

At step 1380 a frame COORD_AP_RESP is generated including a coordinated AP report. Several methods are proposed in the present disclosure. According to a first method, the coordinated AP report corresponds to a Buffer Status Report. It is described with reference to FIG. 14 and it is sent within a frame COORD_AP_RESP described with reference to FIG. 7. According to a second one, the coordinated AP report corresponds to a bandwidth and duration expected values. It is described with reference to FIG. 15 and it is sent within a frame COORD_AP_RESP described with reference to FIG. 8. According to a third one, the coordinated AP report corresponds to the Intra-AP Resource Allocation of the coordinated AP. It is described with reference to FIG. 16 and it is sent within a frame COORD_AP_RESP described with reference to FIG. 9.

At step 1390, the frame COORD_AP_RESP is sent to coordinator AP.

Figure 14:
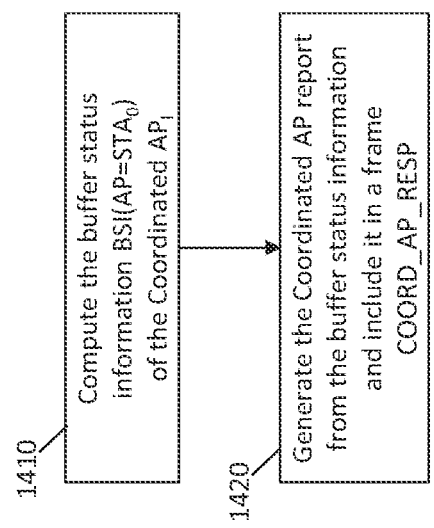
FIG. 14 illustrates the general steps performed by a coordinated AP for generating a coordinated AP report based on a Buffer Status Report, in accordance with one or more example embodiments of the present disclosure.

FIG. 14 illustrates the general steps performed by a coordinated AP for generating a coordinated AP report based on a Buffer Status Report, in accordance with one or more example embodiments of the present disclosure.

A non-AP STA delivers buffer status reports (BSRs), in particular to assist its AP in computing its Intra-AP Resource Allocation. The non-AP STA can either implicitly deliver BSRs in the QoS Control subfield or BSR Control subfield of any frame transmitted to the AP (unsolicited BSR) or explicitly deliver BSRs in any frame sent to the AP in response to a BSRP Trigger frame (solicited BSR). The buffer status reported in the QoS Control subfield consists of a queue size value for a given TID (see 9.2.4.5.6 (Queue Size subfield)). The buffer status reported in the BSR Control subfield, referred to as buffer status information, consists of an ACI bitmap, delta TID, a high priority AC, and two queue sizes.

Consequently, at each reception of a BSR i of an associated STA i, an AP stores the buffer status information BSI(STAi) contained in the received BSR of the STAi.

When a coordinated AP needs to generate a coordinated AP report (step 1380), according to an embodiment of the invention, it performs the steps 1410 and 1420.

At step 1410, the coordinated AP report retrieves its own buffer status information BSI (AP) similarly as it's done with its associated STA.

Next step 1420, the coordinator AP generates the coordinated AP report from its BSI (AP=STA0) and the buffer status information BSI (STAi) of all its associated non-AP STAs. More precisely, a global buffer status information is computed from its BSI (AP=STA0) and the buffer status information BSI (STAi) of all its associated non-AP STAs. Its computation is the following:

A buffer status information BSI(STAi) of an associated STA i is represented by the following parameters: ACI bitmap (STAi), delta TID (STAi), ACI High (STAi), Queue Size High (STAi) and Queue Size All (STAi). The value of I equal to 0 corresponding to the buffer status information of the coordinated AP.

The global buffer status information is represented by the following parameters: ACI bitmap (G), delta TID (G), ACI High (G), Scaling Factor (G), Queue Size High (G) and Queue Size All (G).

The ACI Bitmap subfield indicates the access categories for which the buffer status is reported. More precisely, Each bit j of the ACI Bitmap is dedicated to an access category. The jth bit of ACI bitmap (G) is set to 1 if the jth bit of at least one ACI bitmap (STAi) is set to 1.

The Delta TID subfield, together with the values of the ACI Bitmap subfield, indicate the number of TIDs for which a STA is reporting the buffer status. delta TID (G) is equal to the number of different TID between all the STAi. It is directly computed from ACI bitmap (STAi) and Delta TID (STAi)

The ACI High subfield indicates the ACI of the AC for which the BSR is indicated in the Queue Size High subfield. ACI High (G) corresponds to the maximum occurrence between the set of the ACI High (STAi).

The Queue Size High subfield indicates the amount of buffered traffic, in units of SF octets, for the AC identified by the ACI High subfield that is intended for a STA identified by the receiver address of the frame containing the BSR Control subfield. Queue Size High (G) corresponds to the sum of all Queue Size High (STAi).

The Queue Size All subfield indicates the amount of buffered traffic, in units of SF octets, for all the ACs identified by the ACI Bitmap subfield that is intended for the STA identified by the receiver address of the frame containing the BSR Control subfield. Queue Size All (G) corresponds to the sum of all Queue Size All (STAi).

According to the value of Queue Size All (G), the Scaling Factor (G) is selected.

Finally, the coordinated AP report is included within a frame COORD_AP_RESP 700 as described with reference to FIG. 7. More precisely, ACI bitmap(G) is included in the subfield 741, delta TID (G) is included in the subfield 742, ACI High (G) is included in the subfield 743, Scaling Factor (G) is included in the subfield 744, Queue Size High (G) is included in the subfield 745 and Queue Size All (G) is included in the subfield 746.

Figure 15:
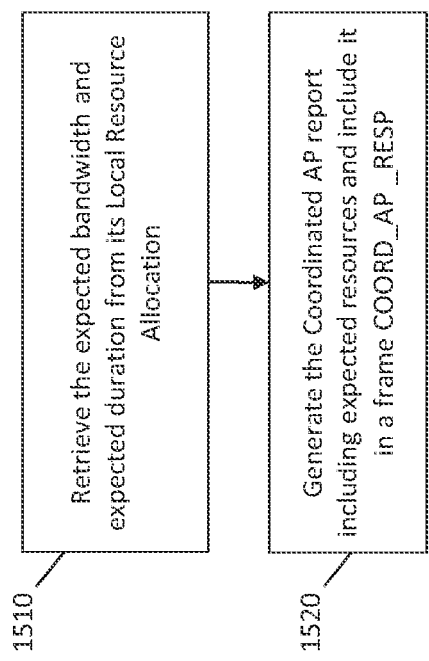
FIG. 15 illustrates the general steps performed by a coordinated AP for generating a coordinated AP report based on an expected bandwidth and duration, in accordance with one or more example embodiments of the present disclosure.

FIG. 15 illustrates the general steps performed by a coordinated AP for generating a coordinated AP report based on an expected bandwidth and duration, in accordance with one or more example embodiments of the present disclosure.

Preferably, an AP computes an Intra-AP Resource Allocation in order to schedule Its DL and UL transmissions with its associated STAs. Its Intra-AP Resource Allocation is allocated over given operating channels of the AP corresponding to a given bandwidth, referred to as "expected BW" and a given period of time, referred to as "expected Duration".

When a coordinated AP needs to generate a coordinated AP report (step 1380), according to an embodiment of the invention, at step 1510, it retrieves the bandwidth "Expected Bandwidth" and the duration "Expected Duration", which corresponds to the coordinated AP Report. Typically, at this instant, the coordinated AP has already computed its Intra-AP Resource Allocation and consequently, the retrieval is direct and instantaneous.

Next, at step 1520, it generates the frame COORD_A_RESP including the bandwidth "Expected Bandwidth" and the duration "Expected Duration" as described with reference to FIG. 8. More precisely, the bandwidth "Expected Bandwidth" is included in the subfield 850 of the frame COORD_AP_RESP 800 and the duration "Expected Duration" is included in the subfield 851 of the frame COORD_AP_RESP 800.

Figure 16:
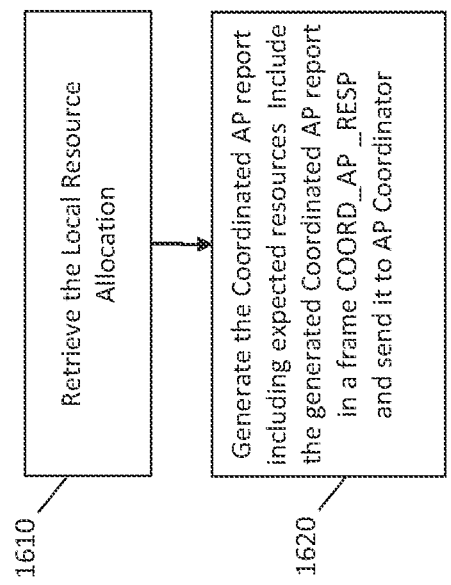
FIG. 16 illustrates the general steps performed by a coordinated AP for generating a coordinated AP report based on the intra-AP resource allocation, in accordance with one or more example embodiments of the present disclosure.

FIG. 16 illustrates the general steps performed by a coordinated AP for generating a coordinated AP report based on the intra-AP resource allocation, in accordance with one or more example embodiments of the present disclosure.

Preferably, an AP computes an Intra-AP Resource Allocation in order to schedule Its DL and UL transmissions with its associated STAs. Basically, according to IEEE 802.11ax, D6.0, when an AP gains the medium, it applies its computed Intra-AP Resource Allocation.

When a coordinated AP needs to generate a coordinated AP report (step 1380), according to an embodiment of the invention, at step 1610, it retrieves its Intra-AP Resource Allocation. In such a case, the Intra-AP Resource Allocation corresponds to the coordinated AP Report.

Next, at step 1620, it generates the frame COORD_AP_RESP including the Intra-AP Resource Allocation as described with reference to FIG. 9. More precisely, it extracts from its Intra-AP Resource Allocation the resources dedicated to itself and includes it in User Info field 960 dedicated to the AP. And next it generates the other User Info fields 970, each one corresponding to a RU allocated to an associated non-AP STA specified in its Intra-AP Resource Allocation.

Figure 17:
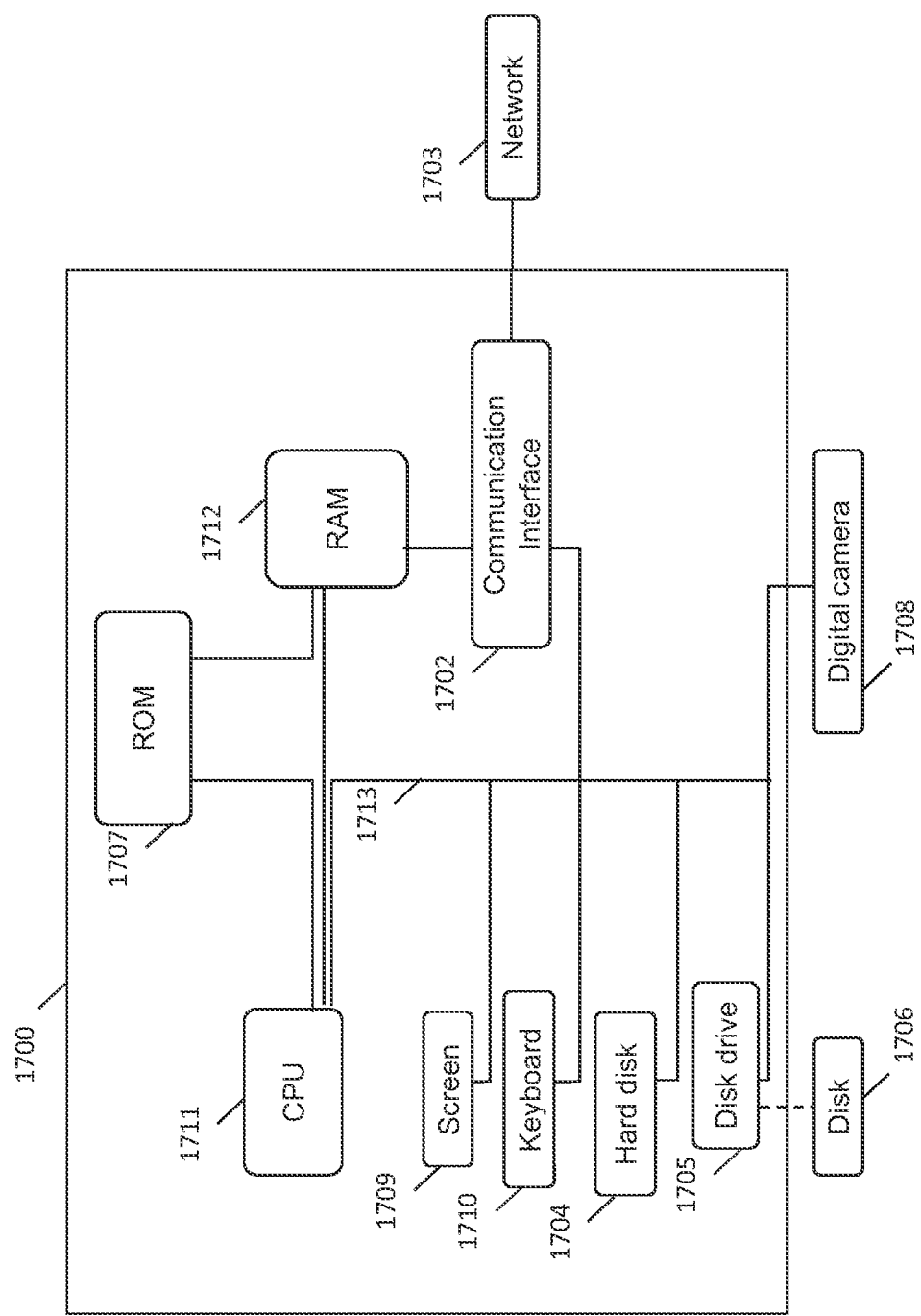
FIG. 17 shows a schematic representation a communication device or station according to embodiments.

FIG. 17 schematically illustrates a communication device 1700 of the radio network 100, configured to implement at least one embodiment of the present invention. The communication device 1700 may preferably be a device such as a micro-computer, a workstation or a light portable device. The communication device 1700 comprises a communication bus 1713 to which there are preferably connected:

- a central processing unit 1711, such as a microprocessor, denoted CPU;
- a read only memory 1707, denoted ROM, for storing computer programs for implementing the invention;
- a random-access memory 1712, denoted RAM, for storing the executable code of methods according to embodiments of the invention as well as the registers adapted to record variables and parameters necessary for implementing methods according to embodiments of the invention; and
- at least one communication interface 1702 connected to the radio communication network 100 over which digital data packets or frames or control frames are transmitted, for example a wireless communication network according to the 802.11ax/be protocols. The frames are written from a FIFO sending memory in RAM 1712 to the network interface for transmission or are read from the network interface for reception and writing into a FIFO receiving memory in RAM 1712 under the control of a software application running in the CPU 1711.

Optionally, the communication device 1700 may also include the following components:

- a data storage means 1704 such as a hard disk, for storing computer programs for implementing methods according to one or more embodiments of the invention;

a disk drive 1705 for a disk 1706, the disk drive being adapted to read data from the disk 1706 or to write data onto said disk;

a screen 1709 for displaying decoded data and/or serving as a graphical interface with the user, by means of a keyboard 1710 or any other pointing means.

The communication device 1700 may be optionally connected to various peripherals, such as for example a digital camera 1708, each being connected to an input/output card (not shown) so as to supply data to the communication device 1700.

Preferably the communication bus provides communication and interoperability between the various elements included in the communication device 1700 or connected to it. The representation of the bus is not limiting and in particular the central processing unit is operable to communicate instructions to any element of the communication device 1700 directly or by means of another element of the communication device 1700.

The disk 1706 may optionally be replaced by any information medium such as for example a compact disk (CD-ROM), rewritable or not, a ZIP disk, a USB key or a memory card and, in general terms, by an information storage means that can be read by a microcomputer or by a microprocessor, integrated or not into the apparatus, possibly removable and adapted to store one or more programs whose execution enables a method according to embodiments of the invention to be implemented.

The executable code may optionally be stored either in read only memory 1707, on the hard disk 1704 or on a removable digital medium such as for example a disk 1706 as described previously. According to an optional variant, the executable code of the programs can be received by means of the communication network 1703, via the interface 1702, in order to be stored in one of the storages means of the communication device 1700, such as the hard disk 1704, before being executed.

The central processing unit 1711 is preferably adapted to control and direct the execution of the instructions or portions of software code of the program or programs according to the invention, which instructions are stored in one of the aforementioned storage means. On powering up, the program or programs that are stored in a non-volatile memory, for example on the hard disk 1704 or in the read only memory 1707, are transferred into the random-access memory 1712, which then contains the executable code of the program or programs, as well as registers for storing the variables and parameters necessary for implementing the invention.

In a preferred embodiment, the apparatus is a programmable apparatus which uses software to implement the invention. However, alternatively, the present invention may be implemented in hardware (for example, in the form of an Application Specific Integrated Circuit or ASIC).

Although the present invention has been described hereinabove with reference to specific embodiments, the present invention is not limited to the specific embodiments, and modifications will be apparent to a skilled person in the art which lie within the scope of the present invention.

Many further modifications and variations will suggest themselves to those versed in the art upon referring to the foregoing illustrative embodiments, which are given by way of example only and which are not intended to limit the scope of the invention, that being determined solely by the appended claims. In particular the different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A wireless communication method in a wireless network comprising a plurality of access points (APs) sharing a communication channel, each AP is configured to manage stations of a basic service set (BSS), the method comprising at a coordinator AP:

signaling to another AP managing another BSS, referred to as coordinated AP, that the coordinator AP has gained access to the communication channel; and sending to the coordinated AP a resource allocation allocating a chunk of the communication channel for stations managed by the coordinated AP, wherein the signaling comprises a response type indication for indicating a response type expected from the coordinated AP, wherein the resource allocation is sent in a user info field of a trigger frame in accordance with IEEE 802.11 standard.

2. The method of claim 1, wherein response type indication indicates that the coordinated AP has to provide resource needs of the BSS the coordinated AP manages.

3. The method of claim 1, wherein response type indication indicates that the resource allocation is performed by the coordinator AP without the coordinated AP has to provide resource needs of its the BSS the coordinated AP manages.

4. The method of claim 1, wherein the response type indication is included in a field of a beacon frame.

5. The method of claim 1, wherein the response type indication is included in a field of a trigger frame adapted to trigger multi-user communications.

6. The method of claim 5, wherein the response type indication corresponds to the trigger Type of a trigger frame in accordance with IEEE 802.11ax standard.

7. The method of claim 1, wherein the response type indication corresponds to a Null Data Packet Feedback report poll trigger frame in accordance with IEEE 802.11ax standard.

8. A wireless communication method in a wireless network comprising a plurality of access points (APs) sharing a communication channel, each AP is configured to manage stations of a basic service set (BSS), the method comprising at a coordinator AP that has gained access to the communication channel:

performing an intra-AP resource allocation by allocating a chunk of the communication channel for stations managed by the coordinator AP; and sending to another AP, referred to as coordinated AP, a resource allocation allocating, for stations managed by the coordinated AP, a chunk from a remaining part of the communication channel not allocated to stations managed by the coordinator AP, wherein the resource allocation is sent in a user info field of a trigger frame in accordance with IEEE 802.11 standard.

9. The method of claim 8, wherein the resource allocation for stations managed by the coordinated AP is determined based on resource needs provided by the coordinated AP.

10. A wireless communication method in a wireless network comprising a plurality of access points (APs) sharing a communication channel, each AP is configured to manage stations of a basic service set (BSS), the method comprising at a coordinator AP:
- signaling to another AP, referred to as coordinated AP, that the coordinator AP has gained access to the communication channel; and
- sending to the coordinated AP a resource allocation allocating a chunk of the communication channel for stations managed by the coordinated AP,
- wherein the resource allocation is determined by sharing the gained communication channel between the plurality of APs without the coordinated APs having provided their resource needs,
- wherein the resource allocation is sent in a user info field of a trigger frame in accordance with IEEE 802.11 standard.

11. The method of claim 10, wherein the resource allocation is determined by sharing the gained communication channel according to a predetermined allocation pattern.

12. The method of claim 10, wherein a chunk of a resource allocation is defined by frequency band, a duration and starting time.

13. A wireless communication method in a wireless network comprising a plurality of access points (APs) sharing a communication channel, each AP is configured to manage stations of a basic service set (BSS), the method comprising at a coordinated AP:
- receiving signaling that another AP, referred to as coordinator AP, has gained access to the communication channel;
- providing, to the coordinator AP, resource needs of stations managed by the coordinated AP; and
- receiving from the coordinator AP a resource allocating a chunk of the communication channel for stations managed by the coordinated AP,
- wherein the resource allocation is received in a user info field of a trigger frame in accordance with IEEE 802.11 standard.

14. The method of claim 13, wherein providing the resource needs comprises sending buffer status reports (BSRs) obtained from the coordinated AP and from stations managed by the coordinated AP.

15. The method of claim 13, wherein providing the resource needs comprises sending a frequency/time specification.

16. The method of claim 13, wherein providing the resource needs comprises sending an intra-AP resource allocation of stations of the coordinated AP.

17. The method of claim 15, wherein the resource needs are provided in a control subfield of an IEEE 802.11 frame.

18. The method of claim 15, wherein the resource needs are provided to the coordinator AP in response to a response type indication contained in the received signaling, the response type indication indicating a response type expected from the coordinated AP.

19. A coordinator access point (AP) in a wireless network comprising a plurality of APs sharing a communication channel, each AP is configured to manage stations of a basic service set (BSS), the coordinator AP comprising a microprocessor comprising at least one microprocessor configured for carrying out steps of:
- signaling to another AP, referred to as coordinated AP, that the coordinator AP has gained access to the communication channel; and
- sending to the coordinated AP a resource allocation allocating a chunk of the communication channel for stations managed by the coordinated AP,
- wherein the signaling comprises a response type indication for indicating a response type expected from the coordinated AP,
- wherein the resource allocation is sent in a user info field of a trigger frame in accordance with IEEE 802.11 standard.

* * * * *